(12) United States Patent
Clark, II et al.

(10) Patent No.: US 9,028,172 B2
(45) Date of Patent: *May 12, 2015

(54) ARTICULATING BAND SAW AND METHOD

(71) Applicant: Tetra Technologies, Inc., The Woodlands, TX (US)

(72) Inventors: Galen R. Clark, II, Lafayette, LA (US); Michael Todd Martin, Youngsville, LA (US); Gary L. Siems, Lafayette, LA (US)

(73) Assignee: Tetra Technologies, Inc., The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/253,215

(22) Filed: Apr. 15, 2014

(65) Prior Publication Data
US 2014/0321919 A1 Oct. 30, 2014

Related U.S. Application Data

(63) Continuation of application No. 13/933,212, filed on Jul. 2, 2013, now Pat. No. 8,696,245, which is a continuation of application No. 12/976,731, filed on Dec. 22, 2010, now Pat. No. 8,475,081, which is a continuation of application No. PCT/US2009/050014, filed on Jul. 9, 2009, which is a continuation-in-part of application No. 12/170,004, filed on Jul. 9, 2008, now Pat. No. 7,645,093.

(51) Int. Cl.
| | | |
|---|---|---|
| B27B 13/00 | (2006.01) | |
| B27B 13/02 | (2006.01) | |
| B63B 35/03 | (2006.01) | |
| F16L 1/20 | (2006.01) | |
| B23D 53/04 | (2006.01) | |
| B27B 13/12 | (2006.01) | |
| B27B 13/16 | (2006.01) | |

(52) U.S. Cl.
CPC ............... B27B 13/02 (2013.01); B63B 35/03 (2013.01); F16L 1/202 (2013.01); B23D 53/045 (2013.01); B27B 13/12 (2013.01); B27B 13/16 (2013.01); F16L 1/207 (2013.01)

(58) Field of Classification Search
CPC ........ B27B 13/00; B27B 13/02; B27B 13/04; B27B 13/10; B27B 13/12; B27B 13/16
USPC .............. 405/154.1, 156, 158, 166, 169, 173; 83/788, 809, 810, 811, 812, 813
See application file for complete search history.

(56) References Cited

U.S. PATENT DOCUMENTS 4,294,149 A * 10/1981 Olsson ...................... 83/435.21
5,213,022 A * 5/1993 Elgan .............................. 83/797

(Continued)

Primary Examiner — Frederick L Lagman
(74) Attorney, Agent, or Firm — Brett A. North; Garvey, Smith, Nehrbass & North, LLC

(57) ABSTRACT

An articulating band saw apparatus provides a frame that includes a vertically extending section having upper and lower end portions. An elevator moves between the upper and lower end portions of the frame. A first hydraulic actuator is supported on the elevator for movement therewith. A first arm provides arm end portions, the first arm supported by the first hydraulic actuator. An end of the first arm supporting a second hydraulic actuator that is spaced away from the first hydraulic actuator. The second hydraulic actuator supports a second arm. An endless band type saw is mounted on the free end of the second arm generally opposite the second actuator. The band saw is movable by articulation of the first and second actuators and resulting movement of the first and second arms. In one embodiment, the band saw is a diamond wire saw.

20 Claims, 16 Drawing Sheets

(56) References Cited

U.S. PATENT DOCUMENTS

| | | | |
|---|---|---|---|
| 5,919,003 A * | 7/1999 | Pregeant et al. | 405/173 |
| 7,645,093 B1 * | 1/2010 | Clark et al. | 405/173 |
| 8,475,081 B2 * | 7/2013 | Clark et al. | 405/156 |
| 8,696,245 B2 * | 4/2014 | Clark et al. | 405/156 |
| 2003/0015322 A1 * | 1/2003 | Fotland et al. | 166/298 |

* cited by examiner

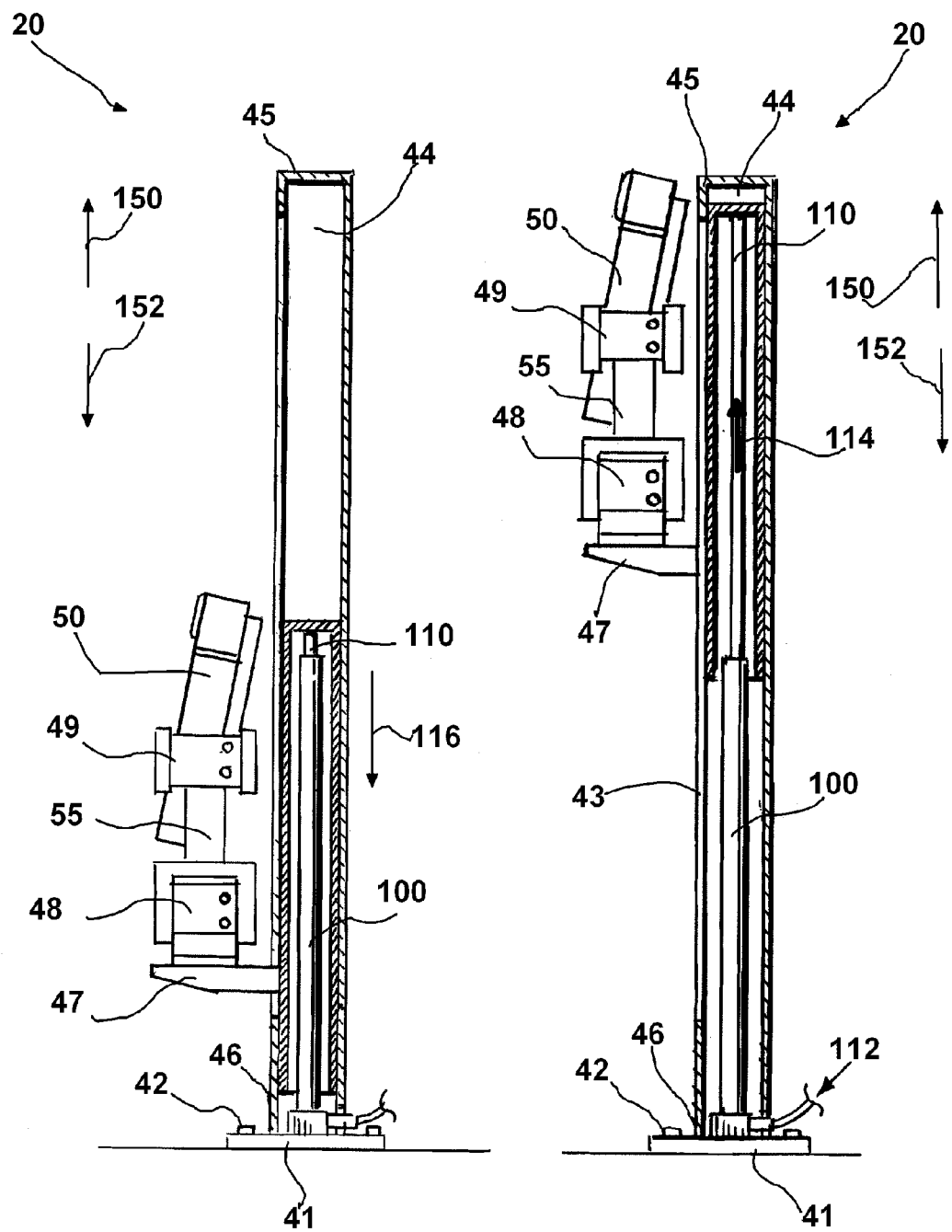

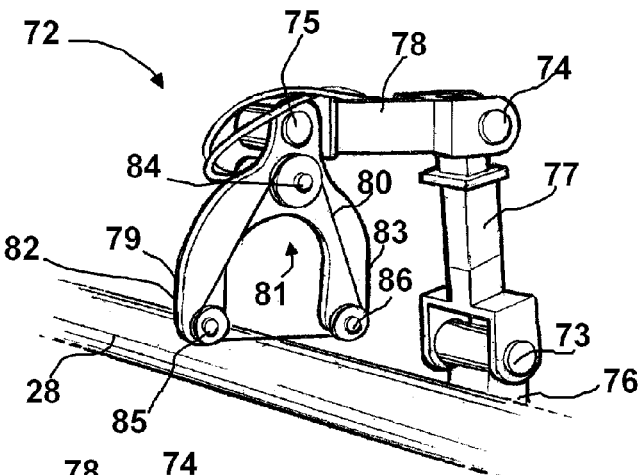
FIG. 20
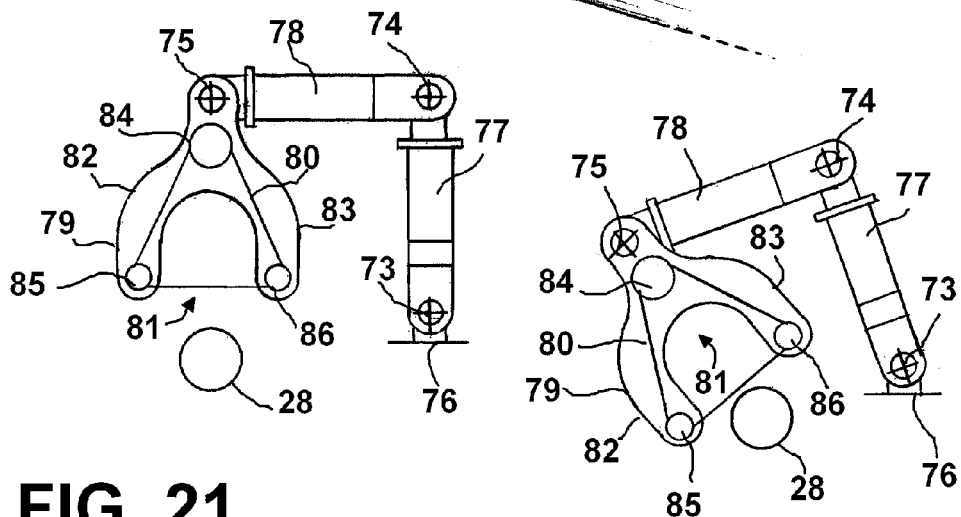
FIG. 21
FIG. 22
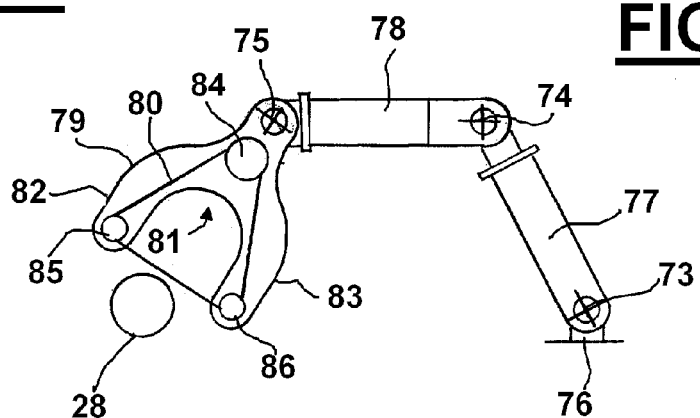
FIG. 23

ARTICULATING BAND SAW AND METHOD

CROSS-REFERENCE TO RELATED APPLICATIONS

This is a continuation application of U.S. patent application Ser. No. 13/933,212, filed Jul. 2, 2013 (issuing as U.S. Pat. No. 8,696,245 on Apr. 15, 2014), which is a continuation application of U.S. patent application Ser. No. 12/976,731, filed Dec. 22, 2010 (issued as U.S. Pat. No. 8,475,081 on Jul. 2, 2013), which was a continuation application of PCT Patent Application Serial Number PCT/US2009/050014, having international filing date of Jul. 9, 2009, which PCT Patent application in the United States was a continuation-in-part of U.S. patent application Ser. No. 12/170,004, filed Jul. 9, 2008 (issued as U.S. Pat. No. 7,645,093 on Jan. 12, 2010).

Priority of each of the above referenced is hereby claimed and each of the above referenced applications are incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND

The present invention relates to a method and apparatus for salvaging and cutting decommissioned oil and gas pipelines into sections. More particularly, the present invention relates to a method and apparatus for cutting target material such as decommissioned oil and gas pipelines into sections as they are pulled from a seabed to a floating or fixed vessel such as a lift boat, and wherein an improved articulating band saw is movable in a generally vertically oriented plane, and in both vertical and horizontal directions.

Salvaging or decommissioning of marine oil and gas pipelines is required after those marine oil and gas pipelines are abandoned or have been damaged such as by storms, hurricanes and the like. In a marine environment, oil and gas pipelines can be miles in length. In order to decommission and salvage such an oil and gas pipeline, the pipeline must be cut into sections. Typically, such decommissioned oil and gas pipelines are simply laying on the seabed.

In the past, "hot work" has been used to cut up pipe sections. "Hot work" (e.g. cutting torch) has the potential for igniting residual hydrocarbons that may be present in the tubulars being cut. Such residual hydrocarbons can otherwise exist in a cutting environment such as from nearby producing well bores.

Cold cutting of decommissioned oil and gas pipelines can be dangerous if for example personnel are required to stand near or participate in the cutting operation. Workers can be injured because of sparking or flying metal debris. Workers directly involved in hot work or cold cutting can be injured by falling material such as sections of material or pipe that have been cut and lifted by a vessel or platform crane.

BRIEF SUMMARY

In one embodiment is provided an improved method and apparatus for salvaging or cutting of decommissioned oil and gas pipelines. The apparatus employs an articulating band saw having a frame that includes a vertically extending section with upper and lower end portions. An elevator moves upon the frame between upper and lower positions. The elevator can be hydraulically powered, using a lifting cylinder or hydraulic cylinder.

In one embodiment a first hydraulic actuator is supported upon the elevator for up and down movement therewith. A first arm is provided having end portions, the first arm supported by the first hydraulic actuator connecting to the actuator at one arm end portion.

In one embodiment a second hydraulic actuator supported by the first arm at a position opposite the first hydraulic actuator and at a second arm end portion. The second hydraulic actuator also supports a second arm.

In one embodiment a band saw is mounted on the second arm generally opposite the second actuator. The band saw is movable by articulation of the first and second actuators and the resulting movement of the first and second arms.

In one embodiment the band saw is mounted on a hydraulic cylinder and piston which in turn is mounted on the elevator, the hydraulic cylinder and piston generally providing side to side movement.

In one embodiment the articulating band saw of the present invention utilizes an industrial type band saw designed to move horizontally and vertically to cut in a vertical plane so as to cut decommissioned oil and gas pipelines into sections as they are pulled from a seabed on to a floating or fixed vessel, such as a lift boat.

In one embodiment the blade of the band saw is driven by a hydraulic motor specifically designed to maintain blade speed at a constant rpm, as specified by the blade manufacturer, with as few as two (2) to seventeen (17) gallons per minute flow rate. Motor torque is independently and automatically maximized by applying up to about two thousand five hundred (2,500) pounds per square inch of hydraulic pressure that is determined by the cutting feed rate.

In one embodiment the band saw is mounted on two independent and remotely controlled hydraulic actuators that are connected to one another and to the saw via arms (e.g. aluminum arms).

In one embodiment the arms can be of varying lengths with their maximum length determined by the constraints of the work area and the operating limits of the hydraulic actuators.

In one embodiment a separate hydraulic control panel allows remote operation of the cutting system to eliminate the need for personnel to work in or near the cutting zone. The hydraulic actuators work independently via the remotely located hydraulic control panel to move and position the cutting region of the saw in various locations along a horizontal plane. This allows ease of positioning or repositioning of the cutting blade should the target material being cut not be constrained to a single or constant point within the cutting region of the saw.

In one embodiment the saw can be raised (e.g. as high as about eight feet vertically) above its mounting base via a hydraulic cylinder with the elevator mechanically attached to the base actuator.

In one embodiment the feed or cutting rate of the saw blade is controlled by lowering the base actuator through releasing and controlling the hydraulic pressure on the lifting cylinder.

In one embodiment, once an optimal cut rate is determined by visual monitoring, it can be maintained constant by the saw operator through monitoring of hydraulic pressure on the lifting cylinder via a pressure gauge and control valve mounted on the hydraulic control panel. Exemplary feed rate pressure for vertical cutting ranges can be between about one hundred forty (140) and two hundred twenty (220) pounds per square inch.

In one embodiment the articulating band saw system is designed for topside (above water) cold cutting on land or offshore work sites, but may be adapted for subsea cutting operations.

In one embodiment the band saw efficiently cuts steel, aluminum, or other materials including asphalt or plastic coated pipes often used in oil and gas pipelines.

In one embodiment the use of band saws for cold cutting tubular steels has been demonstrated to be faster than other cold cutting methods including guillotine and diamond wire saws.

In one embodiment band saw blades may be carbon steel, bi-metal steel or diamond tipped and easily and quickly changed depending upon the material being cut.

In one embodiment the articulating band saw system can cut target material sized from one quarter (¼) inch up to thirteen (13) inches outer diameter (O.D.) tubulars or rectangular shaped targets sized up to about twenty-two (22) inches wide by about thirteen (13) inches in height. Larger saws can be employed to cut larger sized materials.

In one embodiment the hydraulic actuators, arms, and band saw can be modified to cut in a horizontal plane, such as to cut oil well tubulars into sections as they are lifted vertically during removal from a wellbore. This process normally occurs during oil and gas well plugging and abandonment or decommissioning and removal operations.

In one embodiment the horizontal cutting application of the articulating band saw of the present invention requires use of applied hydraulic pressure to the hydraulic actuator(s) to maximize and control the cutting rate, as opposed to a release of hydraulic pressure in the vertical cutting application.

In one embodiment cut rates are determined and maintained consistent by monitoring hydraulic pressure applied to the actuating motor via a pressure gauge instrument mounted on the operator control panel. In one embodiment cutting speed of the cutting blade is maintained between about 110 and 350 feet per minute depending on blade type and construction, and the material being cut.

In one embodiment may be employed a blade coolant and lubrication system that could utilize cooling fluid mediums such as water, cutting oil, or water based lubricants.

In one embodiment, for liquid coolant/lubricants, a recirculation system that collects, contains and filters the coolant/lubricant for reuse can be employed. This recirculation system minimizes coolant/lubricant use and potential environmental contamination.

In one embodiment expanding nitrogen gas may be used as a blade and target material coolant to reduce or eliminate heat generated by friction of the blade against the target material.

In one embodiment a target cooling system can be used to solidify, harden, freeze a portion of the target material being cut. In one embodiment insulation material around the pipe being cut is solidified, hardened, and/or frozen by the cooling system to reduce or minimize the amount of material which is picked up by the saw blade.

In one embodiment a video camera and light can be mounted on the saw to allow operator viewing of the saw position, determine optimal cutting rate, and monitor the cutting process from a remote location. In one embodiment the operator can be in an enclosed room when operating the saw. In one embodiment the enclosed room can be air conditioned. In one embodiment the operator can be on a different area of the vessel compared to the location of the saw. In one embodiment the operator can be on a different deck level compared to the location of the saw.

In one embodiment the remotely controlled horizontal application improves the safety of cutting operations by eliminating hot work (cutting torch) and thereby mitigating the potential for igniting residual hydrocarbons that may be present in the tubulars being cut or that otherwise may exist in the cutting environment from nearby producing well bores. Safety is improved by minimizing or eliminating the need for personnel to be in or near the cut zone during cutting operations (such as would be required when performing hot work). The present invention minimizes or eliminates the need for personnel to be exposed to sparking or flying metal debris. The present invention minimizes or eliminates the need for personnel to be exposed to falling objects, such as the section of material being cut and lifted by the vessel or platform crane.

In one embodiment the band saw cutting head may be interchanged with a diamond wire cutting head. Diamond wire cutting heads are designed to work with the articulating arm system in either the horizontal or vertical cutting configuration. Diamond wire cutting heads can utilize a hydraulic motor to power a drive wheel that rotates a continuous loop of diamond wire around three or four guide wheels or sheaves. The diamond wire feed rate can be controlled by applying pressure to one of the hydraulic actuators to push (or pull) the diamond wire through the target material being cut.

In various embodiments electrical motors can be used to replace the hydraulic motors and/or cylinders. In various embodiments the electrical motors can be explosionproof.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 7 is a sectional side view of the elevator and saw of FIG. 4 showing the piston/cylinder arrangement of the elevator (where the elevator is in a lowered position);

FIG. 8 is a sectional side view of the elevator and saw of FIG. 4 showing the piston/cylinder arrangement of the elevator (where the elevator is in a raised position);

FIG. 20 is a perspective view of an alternative articulating diamond wire saw having three articulating joints;

FIGS. 21 through 23 show the articulating diamond wire saw of FIG. 20 in various articulated positions.

DETAILED DESCRIPTION

Figure 1:
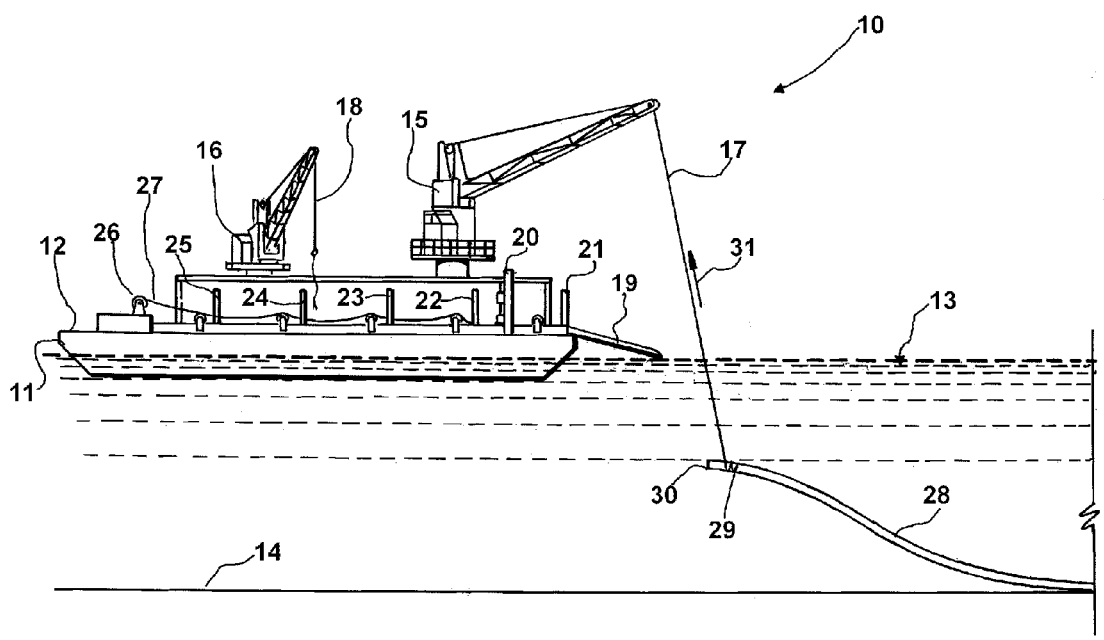
FIG. 1 shows a pipeline being pulled out of the water by a first crane.

FIGS. 1-16 show the preferred embodiment of the apparatus of the present invention, designated generally by the numeral 10. In FIGS. 1-16, pipe cutting system 10 employs a barge or vessel 11 having a deck 12. The barge/vessel 11 is shown floating on water surface 13 above seabed 14 that contains a pipeline 28 to be salvaged. The pipeline 28 is typically a decommissioned oil and gas well pipeline.

Mounted upon deck 12 of barge 11 is first lift apparatus or crane 15. Spaced away from first lift apparatus or crane 15 can be provided a second lift apparatus or crane 16. First lift apparatus 15 provides lift line 17. Second lift apparatus 16 provides lift line 18. A stinger 19 is connected to barge 11 and extends downwardly from deck 12 to water surface 13 as shown in FIGS. 1-3, and 6.

An articulating band saw 20 is placed upon deck 12 of vessel 11. A plurality of pipe supports 21-25 can also be placed at spaced apart intervals along deck 12 as shown in FIGS. 1-3 and 10. Each of the pipe supports 21-25 can employ a roller such as the pipe support roller 36 shown in the drawings.

A winch 26 on deck 12 has a winch cable 27. The winch 26 and winch cable 27 enable the pipeline 28 to be pulled along the deck 12 to the positions shown in FIGS. 2 and 3. In the position shown in FIGS. 2-3 and 6, the pipeline 28 can be cut into sections and then stored in a pipe rack or stacked upon deck 12 as part of salvaging operations.

In FIG. 1 is shown rigging 29 that can include slings, hooks, cables, chains is attached to pipe end 30 and to the lower end portion of crane 15 lift line 17. Arrow 31 in FIG. 1 illustrates the lifting of end 30 of pipeline 28 with lift line 17.

Figure 2:
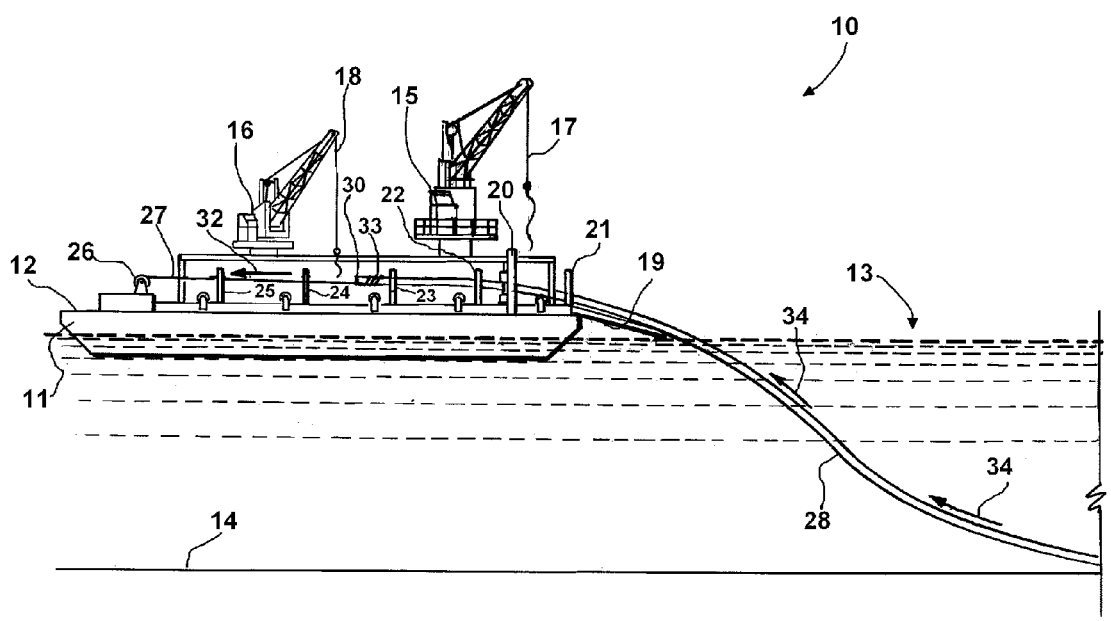
FIG. 2 shows the pipeline being positioned for a cut by an articulating saw.
Figure 3:
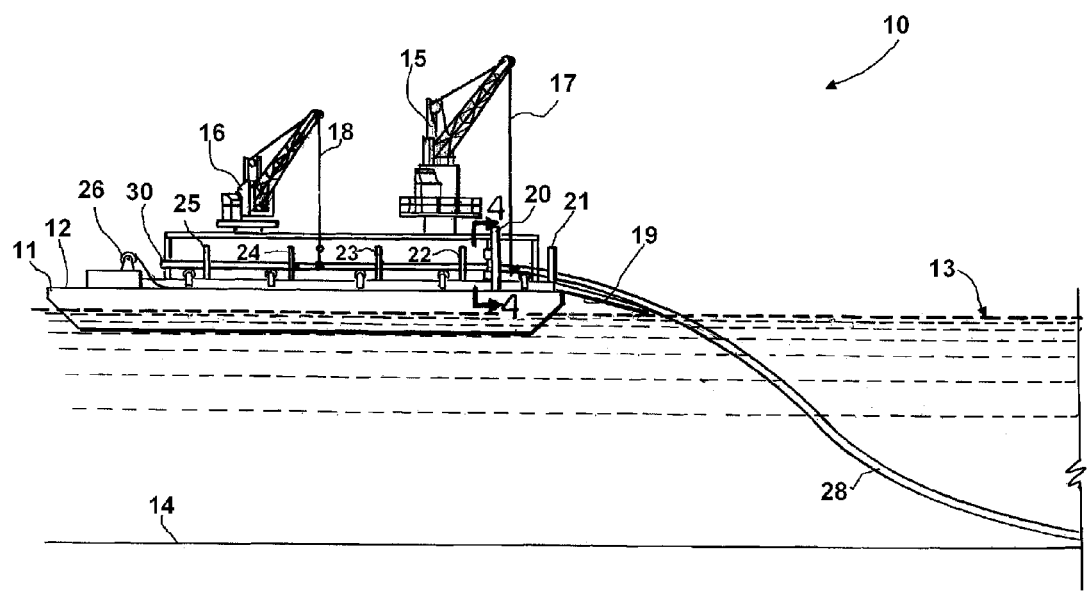
FIG. 3 shows the pipeline immediately before a cut with the first crane supporting the pipe remaining in the water to prevent the remaining pipe from falling into the water after the cut.

In FIG. 2, pipe end 31 is connected to winch cable 27 using a connection 33 that can include similar rigging to the rigging 29 that was employed in FIG. 2. The winch cable 27 is pulled using winch 26 so that the pipe end 30 (and pipeline 28) advances in the direction of arrows 32, 34 in FIG. 2. FIG. 3 shows a cutting position wherein articulating band saw 20 cuts pipeline 28.

Figure 4:
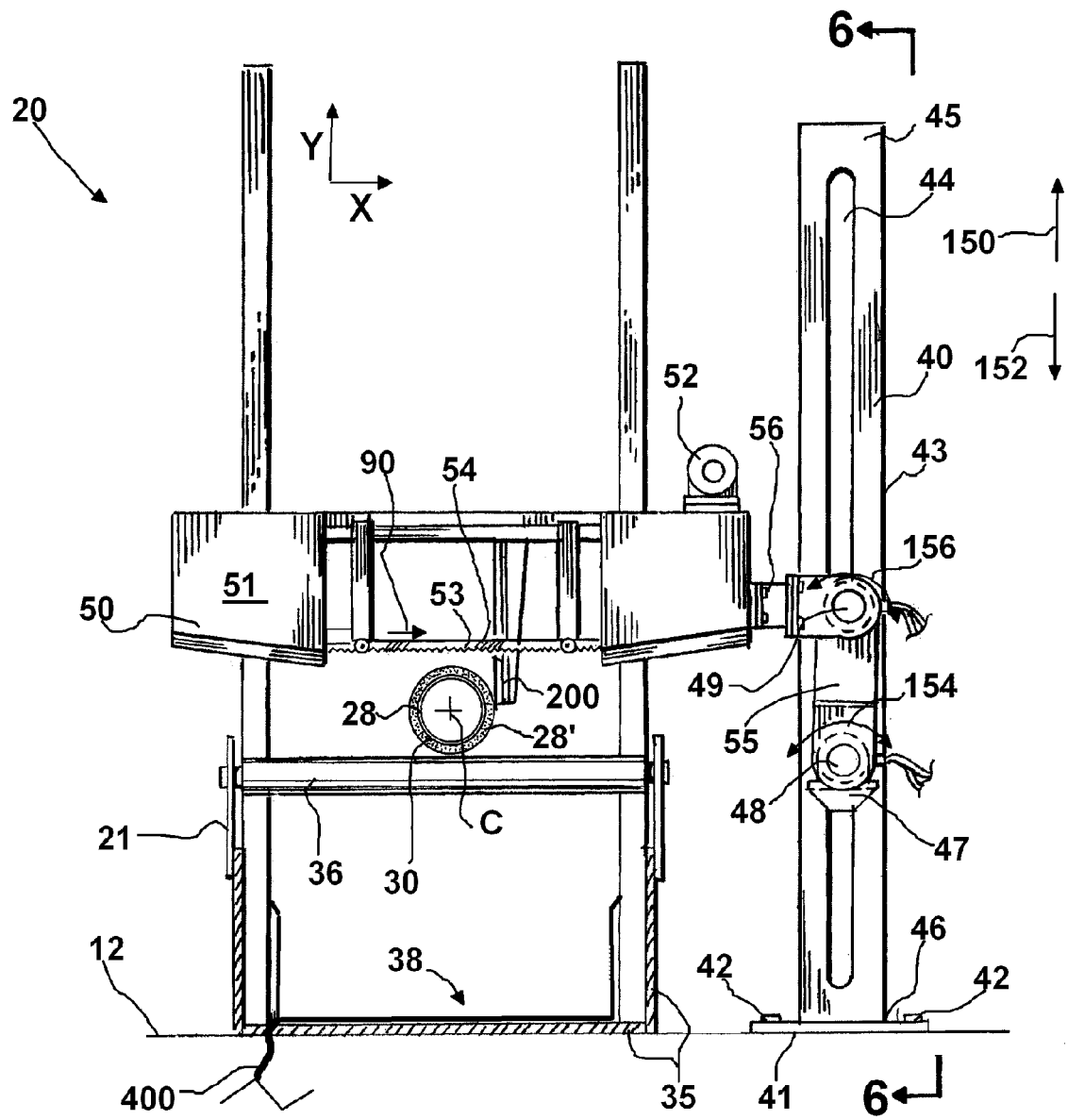
FIG. 4 is a front view of the articulating saw taken from the line 4-4 in FIG. 3 (where the pipe to be cut is shown in sectional view)

In FIGS. 4-9 and 11-16, articulating band saw 20 is shown in more detail. Articulating band saw 20 can include a pipe support frame 35 that provides a roller 36. In FIG. 4, pipeline 28 is resting upon roller 36 of pipe support frame 35. Pipe support frame 35 can be provided by the vessel 11 upon which articulating saw is being used.

A saw support frame 40 can be positioned next to pipe support frame 35 as shown in the drawings. The saw support frame 40 can provide a foot or other base 41 attached to deck 12 using one or more fasteners 42. Column 43 extends upwardly from foot 41. The column 43 contains a hydraulic cylinder 100 or lift cylinder and rod 110 that moves elevator 47 up and down (schematically indicated by arrows 150 and 152 in FIGS. 4-8). An elongated vertical slot 44 is receptive of elevator 47. Column 43 provides upper end portion 45 and lower end portion 46. As schematically indicated by arrow 150 (upwards motion) and arrow 152 (downwards motion), the elevator 47 can be raised and lowered using the hydraulic cylinder or other lift cylinder 100 (such as is commonly used with automobile lifts). FIG. 7 is a sectional side view of the elevator 47 and saw 50 showing the cylinder/rod 100/110 arrangement of the elevator 47 (where the elevator 47 is in a lowered position). FIG. 8 is a sectional side view of the elevator 47 and saw 50 showing the cylinder/rod 100/110 arrangement of the elevator 47 (where the elevator 47 is in a raised position).

In FIGS. 4-9 and 11-16, a pair of hydraulic actuators 48 and 49 are provided. Actuator 48 can be mounted on elevator 47 and travels with elevator 47 as it moves up and down (arrows 150 and 152) between upper end portion 45 and lower end portion 46 of column 43. As schematically indicated by arrows 154 actuator 48 can rotate both clockwise and counterclockwise. A second actuator 49 can be connected to actuator 48 using arm 55. As schematically indicated by arrows 156 actuator 49 can rotate both clockwise and counterclockwise. Arm 55 as shown in FIG. 4 can be an elongated arm having end portions, with hydraulic actuator 48 mounted at one end portion of arm 55 and hydraulic actuator 49 mounted to the opposite end of arm 55. A second arm 56 can be attached to hydraulic actuator 49. Second arm 56 can extend between actuator 49 and band saw housing 51.

The actuators 48, 49 and arms 55, 56 can define an articulating boom 140 having two rotational degrees of freedom (arrows 154 indicating the rotational degree of freedom for actuator 48 and arrows 156 schematically indicating the rotational degree of freedom for actuator 49).

Elevator 47 can provide a linear degree of freedom (arrows 150 and 152 schematically indicating a linear degree of freedom for elevator 47).

Because articulating saw 20 is operatively connected to boom 140 and elevator 47, articulating saw 20 can have three (3) degrees of freedom each of which can be controlled by an operator 61 using a control panel 60.

Articulating band saw 20 can comprise band saw 50. Band saw 50 can includes band saw housing 51 supporting an endless band 53 having a plurality of saw teeth 54. A hydraulic motor drive 52 can be operatively connected to and driving band 53. Hydraulic motor drive 52 can be operatively connected to band 53 by a direct drive, geared drive, chain and sprocket, and/or a pulley and belt system.

Figure 5:
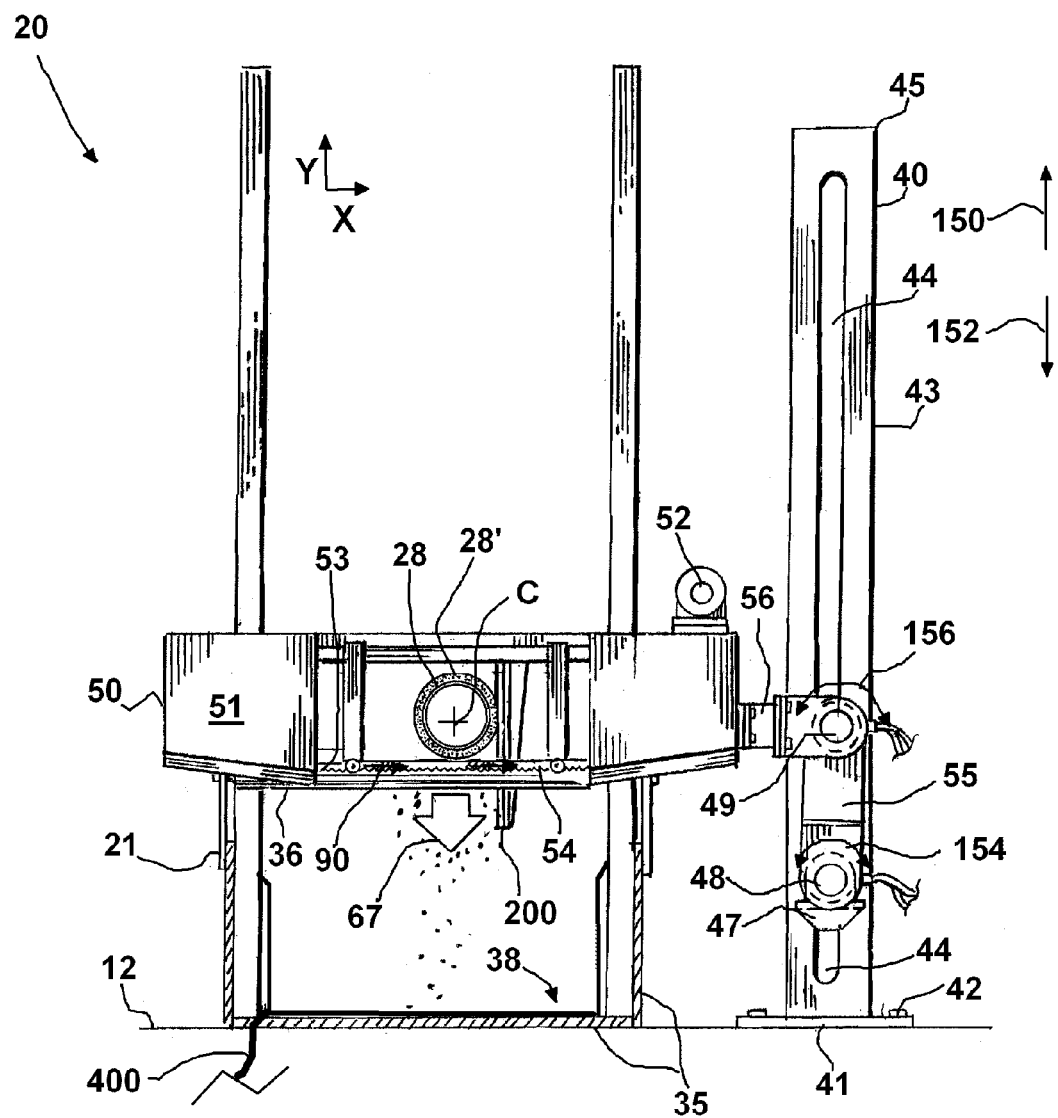
FIG. 5 shows the articulating saw after a complete cut has been made through the pipeline.
Figure 6:
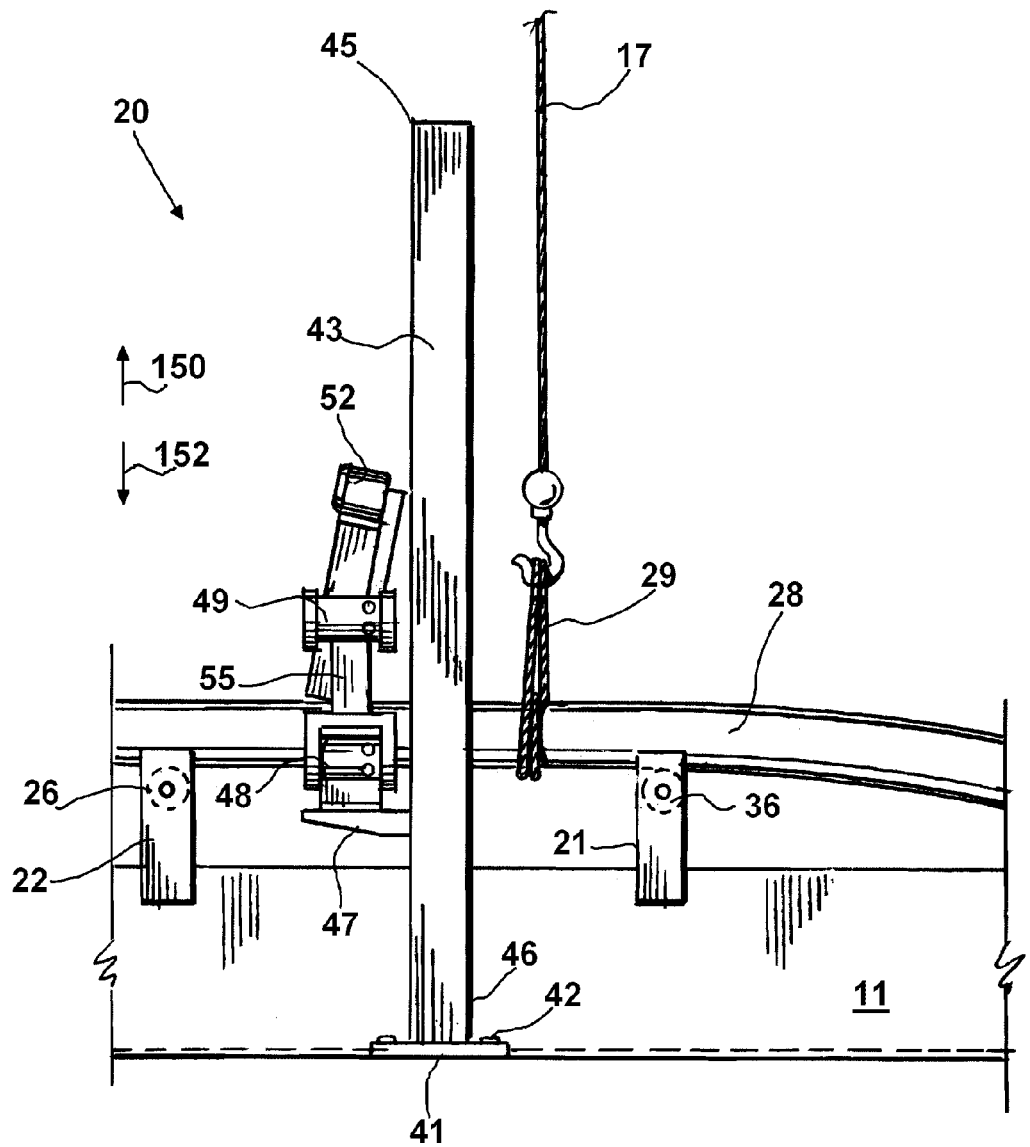
FIG. 6 is a close up side view of the articulating saw and pipeline shown in FIG. 4 taken from the lines 6-6 in FIG. 4.

In order to cut through pipeline 28 using band saw 50, the band saw housing 51 can be lowered as indicated by arrow 67 in FIG. 5. The band saw 50 can be lowered by lowering elevator 47 in the direction of arrow 152 which also lowers arms 55, 56 and frame 51. Because elevator 47 is hydraulically powered to elevate (arrow 150) or lower (arrow 152) using a hydraulic cylinder 110, decreasing hydraulic pressure to cylinder 100 allows the weight of saw 20 and its connected assembly to provide downwards pressure (in the direction of arrow 67) on saw blade 53 as saw blade 53 powers or cuts through pipeline 28. In an alternative embodiment a piston can be connected to rod 110, and downward movement of elevator 47 can be affirmatively powered by hydraulic pressure pushing downwardly on the piston connected to rod 110 of hydraulic cylinder 100, and upward movement obtained by hydraulic fluid pushing upwardly.

All hydraulic functions can be controlled by an operator 61 at hydraulic control panel 60. The hydraulic control panel 60 can provide controls and/or levers 62 that are manipulated by operator 61. Hydraulic control panel 60 can also provide instruments 63 such as hydraulic pressure gauges and/or hydraulic flow meters that can be viewed by the operator 61 during use. Controls/levers 62 can be used to operate the lift cylinder that raises and lowers elevator 47, hydraulic actuators 48, 49, and hydraulic motor drive 52. Hydraulic control panel can also include automatic shutoff lever 125 which, when activated, can shutoff operations of drive motor 52, hydraulic actuators 48 and 49, along with cylinder 100 and rod 110.

In one embodiment control panel 60 can be located in a position where operator 61 can visualize operation of saw 20. In one embodiment control panel 60 can be positioned remote from saw 20 where operator 61 can view activities of saw 20 through a video monitor. For example, control panel 60 can be located in an air conditioned part of the vessel or barge 12 (such as on a different deck).

Actuators 48, 49 can be model numbers L30-25-E-FT-180-S2-0-H manufactured by Helac Corporation out of Enumclaw, Wash.

Figure 15:
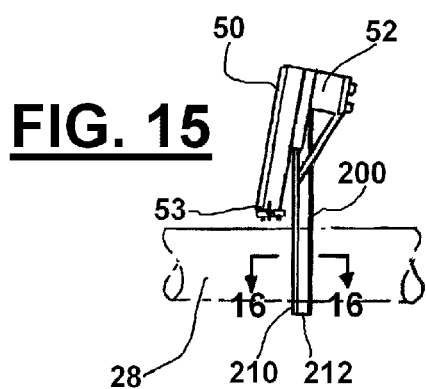
FIG. 15 is a side view of the saw showing the retainer plate.
Figure 16:
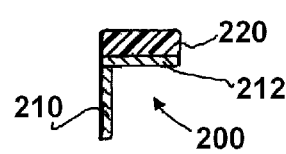
FIG. 16 is a sectional view of the retainer plate taken along the line 16-16 of FIG. 15.

In one embodiment saw blade 53 can be rotated by motor drive 52 in the direction of arrow 90. Because pipeline 28 is not held down in a single position during a cut, pipeline 28 will tend to move in the direction of movement of saw blade 53 (e.g., arrow 90. In one embodiment a retainer 200 is connected to saw housing 51. FIG. 15 is a side view of the saw 50 showing the retainer plate 200. FIG. 16 is a sectional view of the retainer plate 200 taken along the line 16-16 of FIG. 15. As shown in FIGS. 15 and 16, retainer 200 can comprise brace portion 210 and bearing portion 220. Bearing portion 220 is preferably a friction lowering material such as teflon and is sized to reduce side stress placed on pipeline 28. In one embodiment bearing portion 220 is at least ½, ¾, 1, 1½, and/or 2 inches wide. In one embodiment retainer 200 can form an about 90 degree angle with the direction of movement of saw blade 53 (as shown in FIG. 4).

Figure 14:
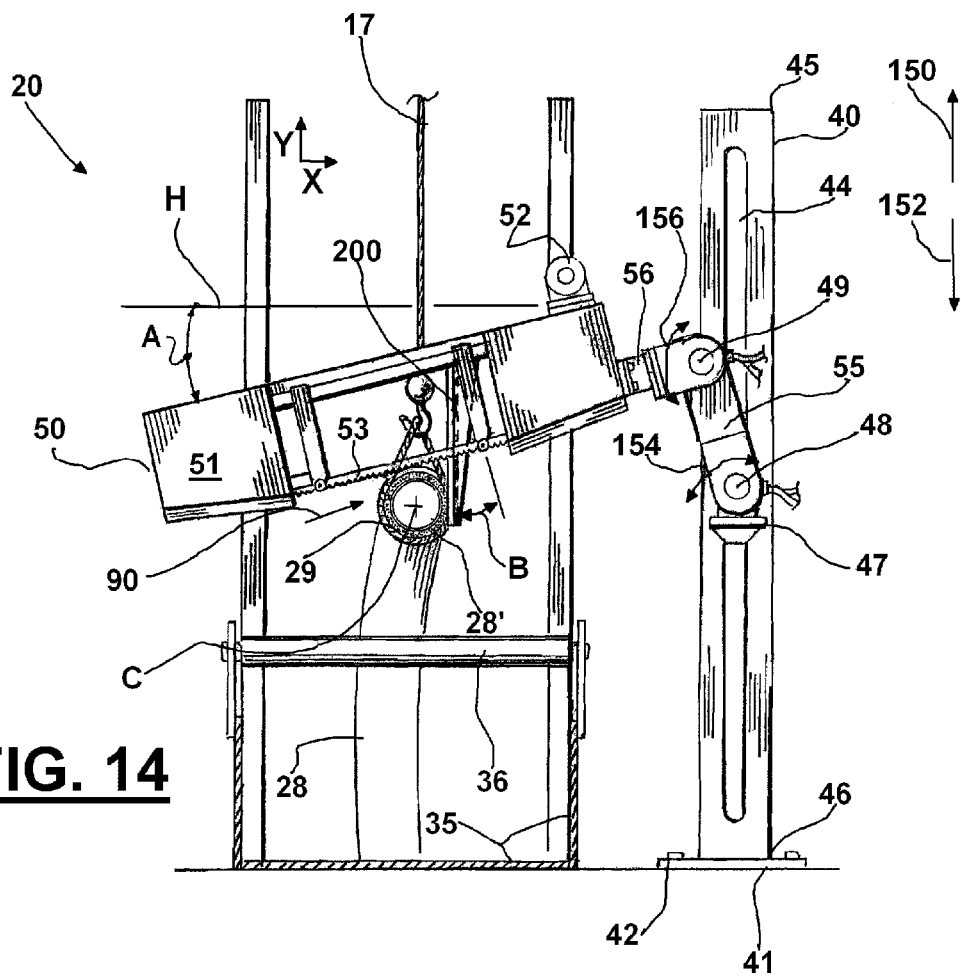
FIG. 14 shows the articulating saw in an angled position (angle "A") about to start a cut on a target pipeline.

In one embodiment retainer 200 can be angled in relation to the direction of movement of saw blade 53 (e.g., as schematically indicated by angle "B" in FIG. 14). In one embodiment, the angle of retainer 200 to saw blade 53 can be about 5, 6, 7, 8, 9, 10, 11, 12, 13, 14, 15, 20, 25, 30, 35, 40, and 45 degrees. Various embodiments the angle of retainer 200 to movement of saw blade 53 can be between about any two of the specified angles. In various embodiments the angle "B" of retainer 200 can be adjustable relative to saw blade 53. In various embodiments the angle of retainer 200 can be adjusted between about any two of the specified angles. In various embodiments an operator 61 can use retainer 200 to position saw blade 53 for making a cut on pipeline 28. In various embodiments retainer 200 can be straight, while in other embodiments the retainer can be curved (either convexly or concavely) in relation to the pipeline 28 being cut.

Figure 10:
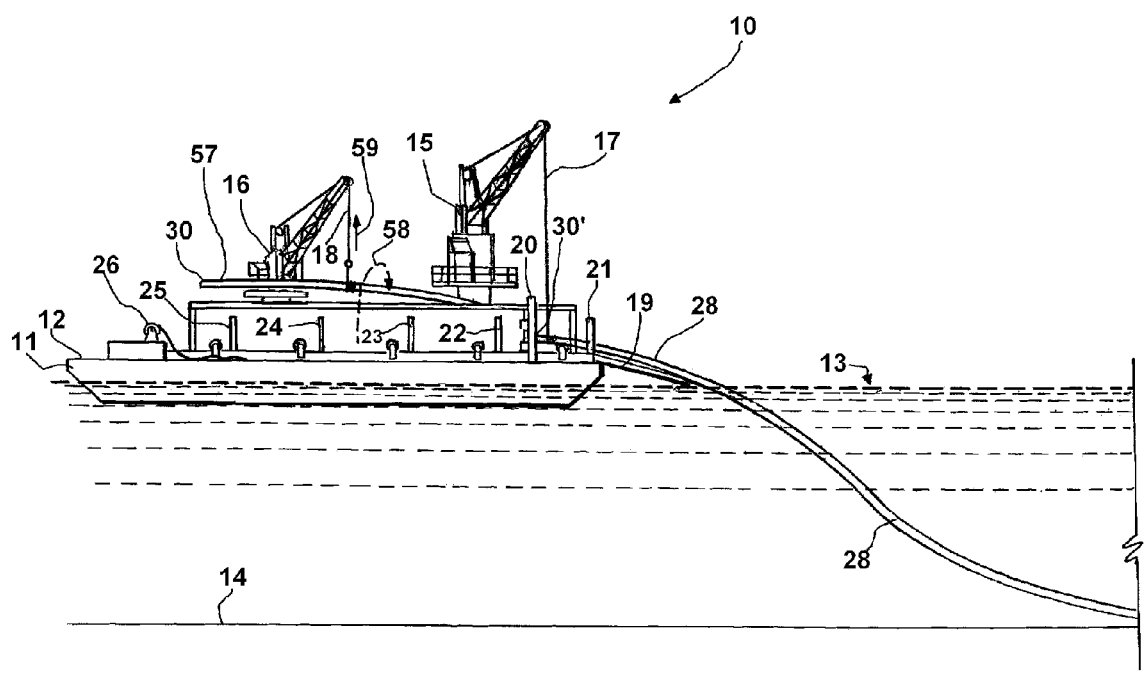
FIG. 10 shows the cut section of pipe being moved to a storage location by a second crane while the first crane supports the remaining pipe.

After the saw band or blade 53 cuts through pipeline 28, a cut section 57 of pipe is created, being supported upon pipe supports 22-25. In FIG. 10, the cut section 57 of pipe is shown being lifted with second crane 16 and its lift line 18 (schematically indicated by arrow 59 in FIG. 10). Arrow 58 illustrates the path that is traveled by cut section 57 of pipe as it is moved from pipe supports 22-25 to a storage position on deck 12 such as a pipe rack or to another vessel (e.g. barge).

Figure 9:
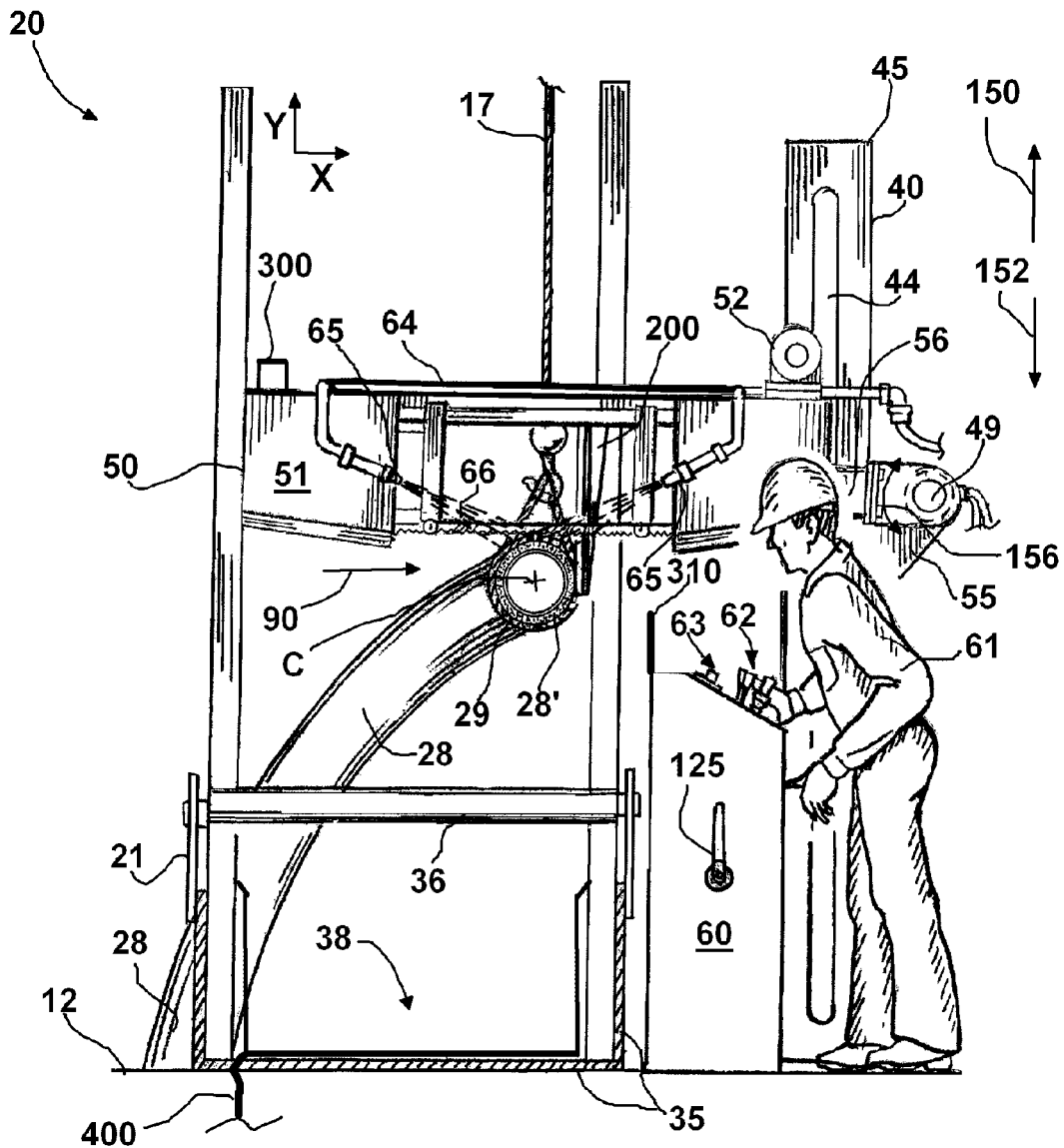
FIG. 9 is a front view of the articulating saw being controlled by an operator using a hydraulic control panel where the saw is shown with a lubricating/cooling system.

FIG. 9 shows control panel 60, an operator 61, controls or levers 62, and instruments or gauges 63. FIG. 9 also shows an optional lubricating/cooling system. The lubricating/cooling system employs header 64 or other conduit, a pair of nozzles 65, each nozzle generating a fluid spray 66 of cooling fluid or lubricating fluid to the area of pipeline 28 that is to be cut. The lubrication system can be reclaimed using catch basin 38 which is positioned under the area of pipeline 28 being cut. In one embodiment a target cooling system can be used to solidify, harden, freeze a portion of the pipeline 28 being cut. In one embodiment insulation material around pipeline 28 being cut is solidified, hardened, and/or frozen by the cooling system to reduce or minimize the amount of material which is picked up by saw blade 54.

After the cut section 57 of pipe has been removed from the pipe supports 22-25, winch line 27 is again connected to pipeline 28, and pipeline 28 is pulled along supports 22-25 for another section 57' (not shown in the figures) to be cut looking similar to the position originally shown in FIG. 3. An additional cut is then made to create a second cut section 57' of pipe. This process of pulling pipeline 28 and cutting sections 57, 57', 57", etc. can be repeated until pipeline 28 has been completely removed from the seabed 14. In this manner pipeline 28 can be salvaged and decommissioned.

Figure 11:
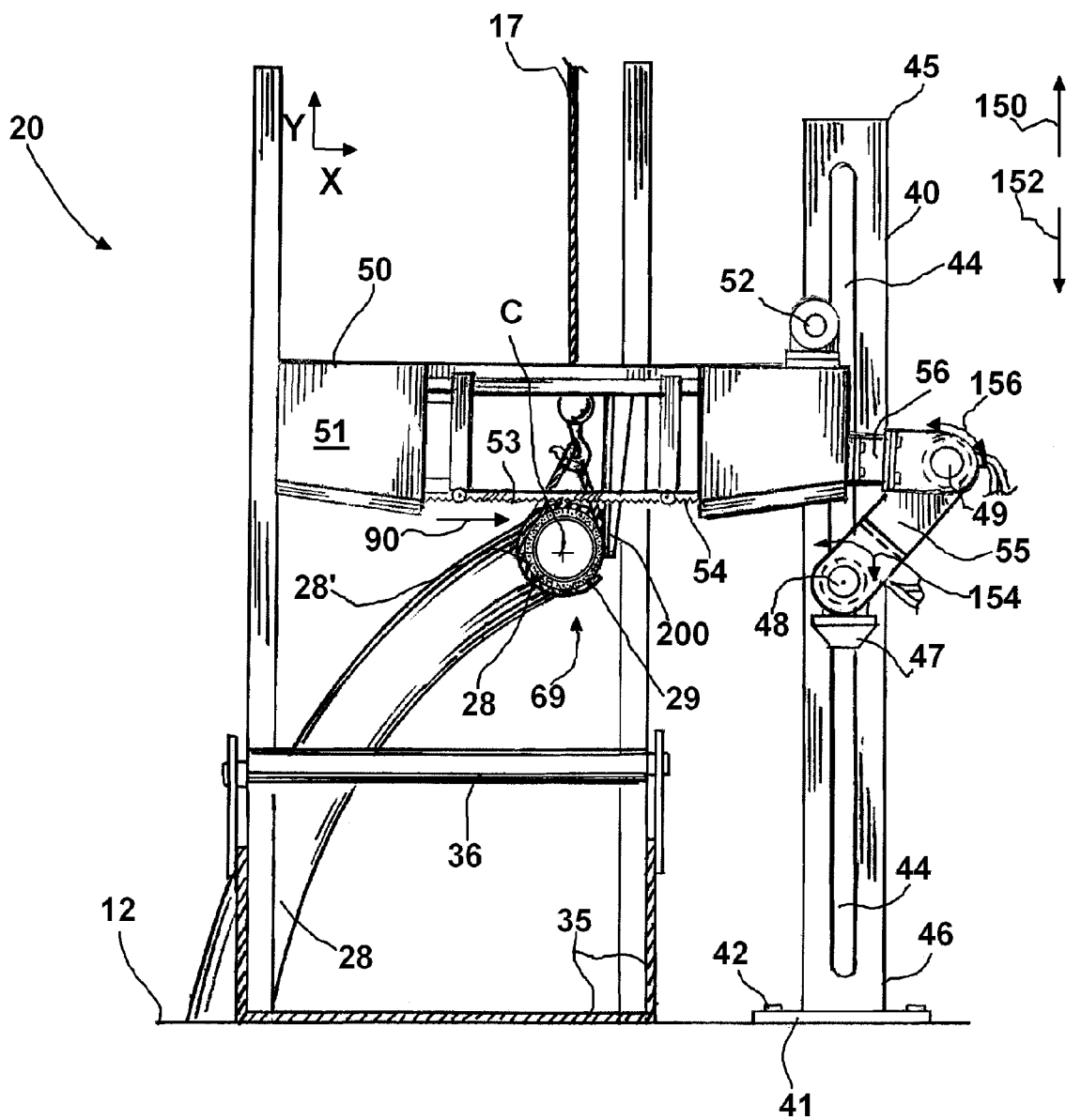
FIG. 11 shows the articulating saw after it has been moved to upwardly and to the right in a vertical X-Y plane (compared to the position shown in FIG. 5) for making to making a cut in the pipeline.
Figure 12:
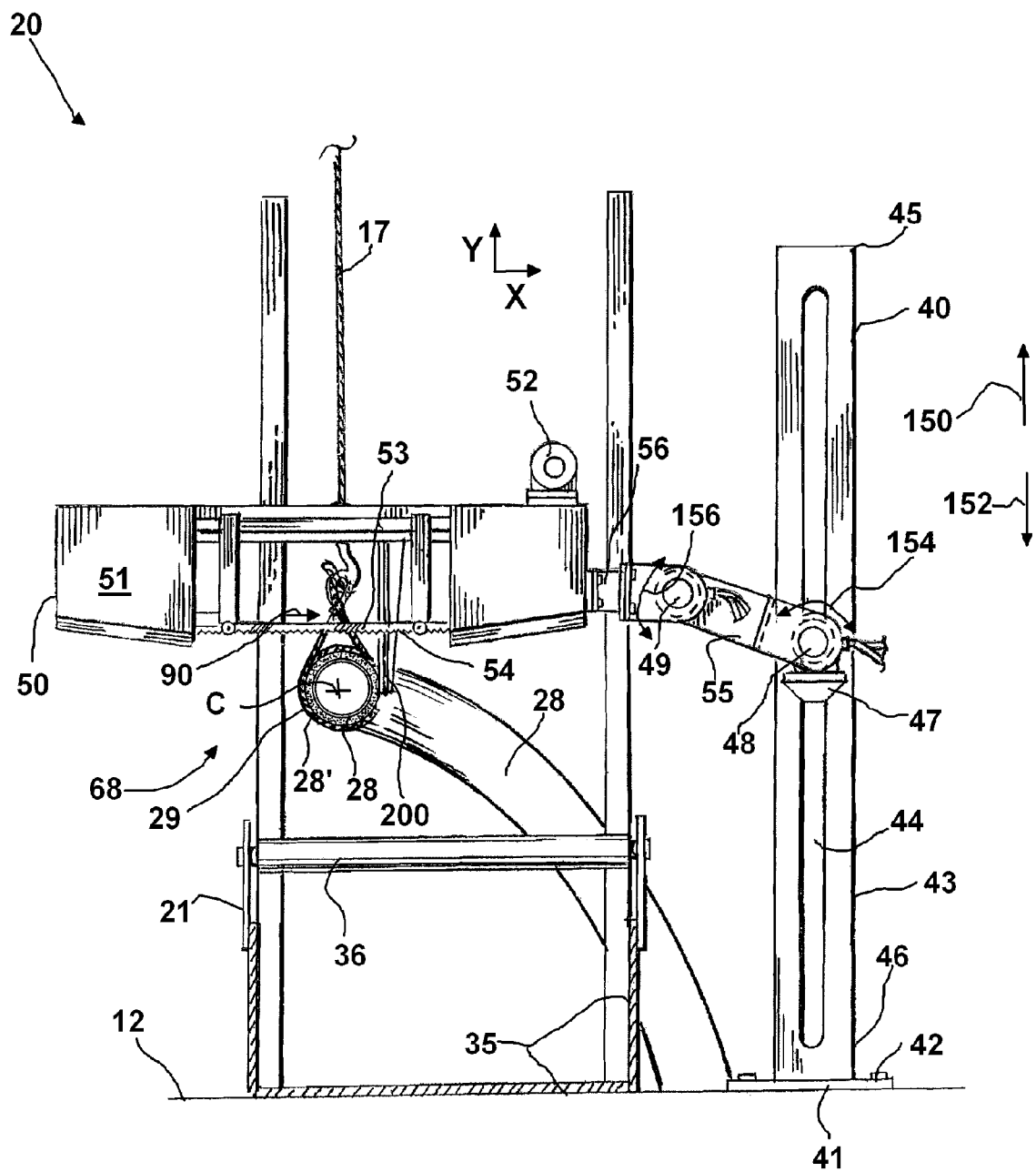
FIG. 12 shows the articulating saw after it has been moved upwardly and to the left in a vertical X-Y plane (compared to the position shown in FIG. 5) for making a cut in the pipeline where the pipeline is in a similar position in the vertical plane.

One challenge occurring during the cutting off pipeline 28 is the various positions the center "C" of pipeline 28 can be when it is to be cut. It is difficult to ensure that the center "C" of pipeline 28 will always be at the same X-Y Cartesian position in a vertical plane from cut to cut. In FIG. 12, the pipe position is designated generally as 68. In FIG. 11, the pipe position is designated generally as 69. In these cases, notice that the articulating arms 55, 56 (and elevator 47) of articulating saw 20 allow saw frame 51 to change in position responsive to movement of actuator 48 (schematically indicated by arrows 154); actuator 49 (schematically indicated by arrows 156); and elevator 47 (schematically indicated by arrows 150 and 152) to adjust position of saw frame 51 and blade 53 to make a cut regardless of where pipeline 28 is located in the vertical X-Y plane.

FIGS. 9-16 illustrate that the saw apparatus 20 can cut pipeline 28 even if pipeline 28 is in a position spaced away from roller 36. In FIGS. 9 and 11, the saw 50 has been moved upwardly and to the right in a vertical X-Y plane (when compared to the position shown in FIG. 4) for making a cut in the pipeline 28. FIG. 12 shows the articulating saw 50 after it has been moved upwardly and to the left in a vertical X-Y plane (when compared to the position shown in FIG. 5) for making a cut in the pipe.

Figure 13:
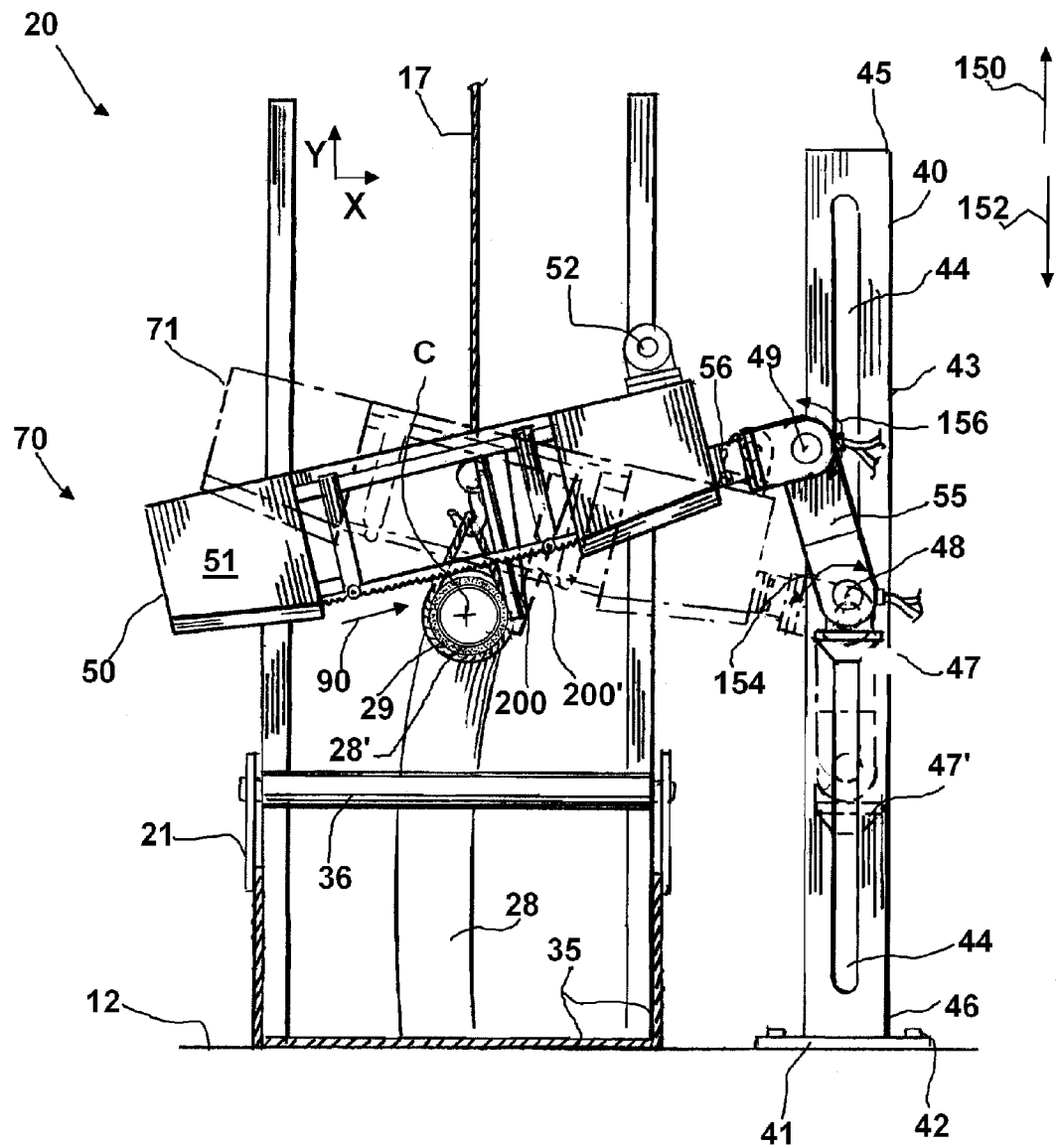
FIG. 13 shows the articulating saw in two different rotational positions compared to the horizontal position shown in FIG. 5) while remaining in the vertical X-Y plane.

FIGS. 13 and 14 show that the articulating saw 20 can be placed in different relative rotational positions compared to the generally horizontal position (schematically indicated by the "X" axis) shown in FIG. 5 while still remaining in a vertical X-Y plane. These two rotational positions (designated 70 and 71 in FIG. 13) are shown in phantom lines and in hard lines. The rotational position 70 is in hard lines while the rotational position 71 is in phantom lines.

FIG. 14 shows the articulating saw 20 in an angled position (angle "A") and about to start a cut on a target pipeline 28 where center "C" of pipeline 28 is positioned as shown. In this embodiment retainer 200 is angled (at an angle "B" from the direction of movement of saw blade 53 (schematically indicated by arrow 90)). In one embodiment angle "A" can be about equal to angle "B". It has been found that by making angle B and angle "A" about 10 degrees vibration or chatter between saw blade 53 and pipeline 28 can be substantially reduced, minimized, and/or eliminated during the cut especially where pipeline 28 is in the air (e.g., located above pipe support roller 36).

Figures 17, 18:
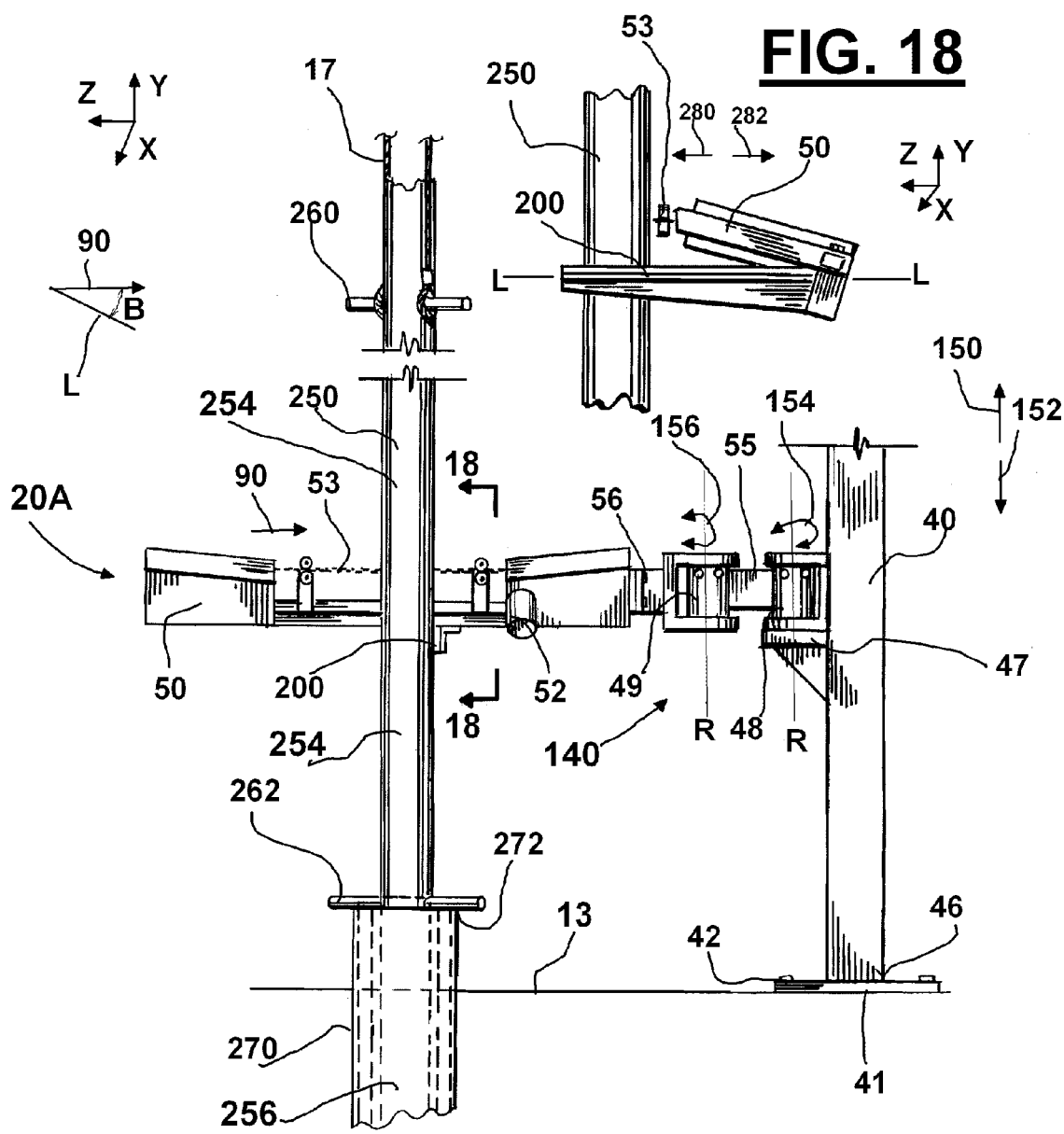
FIG. 17 shows an alternative version of an articulating saw where the saw and its two pivoting joints have been rotated ninety degrees relative to the X-Y plane shown in FIG. 16.
FIG. 18 is a sectional view of the saw of Figure taken along the line 18-18 of FIG. 17.

FIGS. 17 and 18 show an alternative version of an articulating saw 50' where the saw 20A and its two pivoting joints (48 and 49) have been rotated ninety degrees relative to the X-Y plane shown in FIG. 16 causing blade 53 to be contained in a generally horizontal plane (the Z-X Plane) which is generally parallel to the "X" axis and generally perpendicular to the plane containing the "X" and "Y" axes of FIG. 16.

FIG. 18 is a sectional view of the saw 50 taken along the line 18-18 of FIG. 17. Rotating saw 50 by ninety (90) degrees allows saw 50 to make generally horizontal cuts through control of hydraulic actuators 48 (schematically indicated by arrows 154) and 49 (schematically indicated by arrows 156) articulating boom 140 which boom 140 includes arms 55 and 56. Similar to the embodiment shown in FIG. 16, retainer 200 can be angled (at an angle "B" from the direction of movement of saw blade 53 (schematically indicated by arrow 90)). Elevator 47 can move vertically in the directions of arrow 150 and 152 (similar to the other embodiments). Blade 53 can be moved generally in the directions of arrows 280 or 282 (FIG. 18) by operator 61 at control panel 60 by selective articulating actuators 48 and/or 49 in to pivot about their axes of rotation "R" respectively in the directions of arrows 154 and 156. By selective pivoting of actuators 49 and/or 49 the Z-X location of blade 53 can be controlled by operator 61. Additionally, the angle of cut between saw blade 53 (moving in the direction of arrow 90) and the target material 250 can be controlled by operator 61. In this case the angle of cut would be angle "A" shown in FIG. 16 although angle "A" now being in the Z-X plane instead of the X-Y plane. In one embodiment angle "A" can be about equal to angle "B" and can be about 5, 10, and/or 15 degrees.

In FIG. 17 the target material 250 can be a tubular, drill string, piping, or other casing which is to be removed from a well bore and/or riser. As schematically shown in FIG. 17 a lift line 17 can be attached to the target material 250 such as through use of a support rod 260. Support rod 260 can be installed in target 250 by drilling holes and then sliding in support rod 260, and then attaching lift line 17 (which lift line can be connected to a vessel's crane 15) to support rod 260. In this embodiment it is preferred that vessel 11 be a jack up vessel. A second support rod 262 could similarly by installed in target 250 at a lower level; and the second support rod 262 could itself be supported by remaining riser portion 272 or wellhead or other supporting device—so that second support rod 262 supports remaining target portion 256 of target after a cut is made.

Operator 61 moves saw 50' and blade 53 in the Z-X location of choice beginning a cut using actuators 48 and/or 49. Preferably, target is touching retainer 200 and an angle "A" is made with blade 53 which is about equal to angle "B" between retainer 200 and the direction of movement 90 of blade 53. The generally horizontal cut is made with blade 53 an upper section 252 of target 250 to be separated. Upper section of target 252 can be moved by crane 15 to a storage location (and support rod 260 removed for reuse). Next, lift line 17 can be connected to support rod 262 and remaining portion 256 of target 250 can be lifted in the direction of arrow 150 so that support rod 262 is generally in the position of support rod 260 of FIG. 17. Support rod 260 (or a new support rod) can then be placed in remaining target 250 around the original position of support rod 262 shown in FIG. 17 (such as by drilling holes in target 250). A new cut can be made by saw 51 with the newly cut off piece lifted by crane 15 (and lift line 17) to a storage location. Remaining target 250 will be supported by the lower support rod on remaining riser portion 272 or wellheld or other supporting device. These steps of cutting, lifting, stowing, and re-cutting can be repeated until entire target 250 has been removed.

Figure 19:
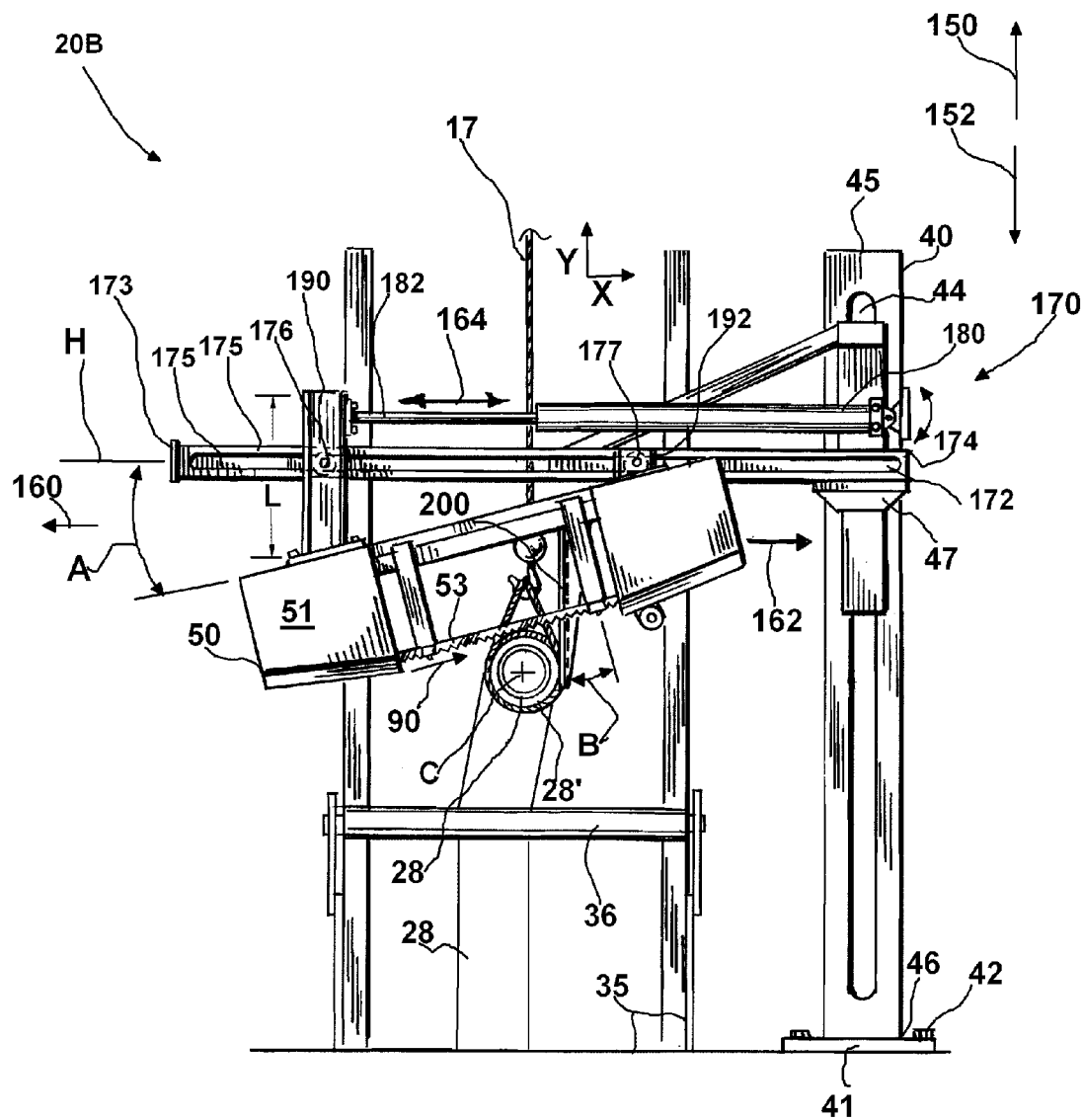
FIG. 19 shows an alternative articulating saw having a sliding boom, the saw blade being shown in an angled position (angle "A") about to start a cut on a target pipeline.

FIG. 19 shows an alternative articulating saw 20B having a sliding boom 170, the saw blade 53 being shown in an angled position (angle "A") about to start a cut on a target pipeline 28. In this alternative embodiment a sliding boom 170 replaces the dual hydraulic actuators 48 and 49 of articulating boom 140. Articulating boom 170 can include track 172 having first 173 and second 174 ends with a slot 175 spanning between these ends. Saw 50 can be supported by boom 170 via support arms 190 and 192. Support arms 190 and 192 can be slidably connected to track via rollers 176 and 177. Hydraulic cylinder 180 and rod 182 can be operatively connected to support arm 190 (and/or 192) to provide controlled movement of saw 50 in the direction of arrows 164. Operator 61 can use control panel 61 to selectively control movement of rod 182 in the direction of arrow 160 and/or arrow 162. Boom 170 can be connected to elevator 47, and like the other embodiments vertical movement of saw 50 (in the directions of arrow 150 and/or 152) can be obtained by operator 61 using control panel to raise or lower elevator 47. By selective movements of elevator 47 (in the direction of arrow 150 and/or 152) and rod 182 (in the direction of arrow 160 and/or 162) saw blade 53 can be selectively positioned in any X-Y position in a vertical plane to make a cut on pipeline 28 depending on the position of its longitudinal center "C." Unlike the other embodiments, this embodiment does not include the ability of operator to selectively control the rotational position of saw blade 53 relative to a horizontal line H (i.e., varying angle "A" while simultaneously moving in one of the other directions (e.g., arrows 150,152,160, and/or 162). Instead, during any one cut its rotational position "A" can be determined by the length "L" of support arm 190. As with other embodiments angle "B" of retainer is preferably about the same as angle "A." In an alternative embodiment the length "L" of support arm can be adjustable (such as by using an adjustment slot in the connection between support arm 190 and roller 176), which would provide operator 61 the option of varying angle "A" at least between cuts. In this embodiment angle "B" would also preferably be adjustable. In another alternative embodiment the length "L" of support arm 190 could be adjustably varied such as by putting a vertical track and cylinder connection between support arm 190 and saw 50 (similar to horizontal track 175 and cylinder 180). As the length "L" of support arm 190 varies, support arm 192 will pivot on roller 177 relative to horizontal line "H."

FIGS. 20-23 show another alternate embodiment of the apparatus of the present invention, designated generally by the numeral 72. In FIGS. 20-23, an articulating diamond wire saw 72 is provided. The articulating diamond wire saw 72 is positioned by three hydraulic actuators 73, 74, 75. The actuator 73 is attached to a frame or elevator 76. Arm 77 connects actuator 73 to actuator 74. Arm 78 connects actuator 74 to actuator 75. A generally u-shaped frame 79 supports diamond wire 80. The diamond wire 80 can be supported with a plurality of roller guides 84, 85, 86. The roller guide 84 can be powered using a hydraulic motor. U-shaped frame 79 provides a concavity 82 that is in between two arms or ends 82, 83. FIGS. 18-20 show various positions of U-shaped frame 79 relative to pipeline 28 when making a cut. The articulating arms 77, 78 as controlled by actuator 73, 74, 75 enable the diamond wire 80 to be placed in multiple positions for assisting in a cutting of pipeline 28.

Methods of Use

In one embodiment the method includes the step of articulating actuator 48 in a first rotational direction. In one embodiment the method includes the step of articulating actuator 48 in a second rotational direction, the second rotational direction being the opposite of the first rotational direction. In one embodiment the method includes the steps of articulating actuator 48 in opposite first and second rotational directions.

In one embodiment the method includes the step of articulating actuator 48 in a first rotational direction. In one embodiment the method includes the step of articulating actuator 49 in a second rotational direction, the second rotational direction being the opposite of the first rotational direction. In one embodiment the method includes the steps of articulating actuator 49 in opposite first and second rotational directions.

In one embodiment the method includes the step of articulating actuators 48 and 49 in a first rotational direction. In one embodiment the method includes the step of articulating actuators 48 and 49 in a second rotational direction, the second rotational direction being the opposite of the first rotational direction. In one embodiment the method includes the steps of articulating actuators 48 and 49 in opposite first and second rotational directions.

In one embodiment the method includes the step of moving elevator 47 in a first linear direction. In one embodiment the method includes the step of moving elevator 47 in a second linear direction, the second linear direction being the opposite of the first linear direction. In one embodiment the method includes the steps of moving elevator 47 in opposite first and second linear directions.

In one embodiment the method includes the step of articulating actuators 48 and 49 in a first rotational direction and elevator 47 in a first linear direction. In one embodiment the method includes the step of articulating actuators 48 and 49 in a second rotational direction and elevator 47 in a second linear direction, the second rotational direction being the opposite of the first rotational direction, the second linear direction being the opposite of the first linear direction. In one embodiment the method includes the steps of articulating actuators 48 and 49 in opposite first and second rotational directions, and elevator 47 in opposite first and second linear directions.

In one embodiment the method includes the step of, while making a cut on pipeline 28, increasing the speed of saw blade 53, decreasing the speed of saw blade 53, and then increasing the speed of saw blade 53.

In one embodiment the method includes the step of, while making a cut on pipeline 28, decreasing the feed rate of saw blade 53, increasing the feed rate of saw blade 53, and then decreasing the feed rate of saw blade 53.

In one embodiment the method includes the step of, while making a cut on pipeline 28, repositioning the angle A saw blade 53 has with a horizontal line H. In one embodiment the method includes the step of, while making a cut on pipeline 28, moving saw blade 53 out of the cut slot in pipeline 28 when the cut slot had been made with saw blade 53 at an angle A, and then starting the same cut with saw blade 53 at another angle A' which is different than angle A.

In one embodiment the saw blade 53 is used to make a first cut on a pipeline 28 at a first vertical height, and control panel 60 is used to move saw blade 53 to a second vertical height for a second cut on pipeline 28, the second vertical height being spaced apart from the first vertical height by at least 6 inches, 1, 2, 3, 4, 5, 6, 7, 8, 9, and/or 10 feet. In various embodiments the spacing can be between about any two of the specified distances. In various embodiments the change in position can be in the same X-Y vertical plane.

In one embodiment the saw blade 53 is used to make a first cut on a pipeline 28 at a first horizontal location, and control panel 60 is used to move saw blade 53 to a second horizontal location for a second cut on pipeline 28, the second horizontal location being spaced apart from the first horizontal location by at least 6 inches, 1, 2, 3, 4, 5, 6, 7, 8, 9, and/or 10 feet. In various embodiments the spacing can be between about any two of the specified distances. In various embodiments the change in position can be in the same X-Y vertical plane.

In one embodiment the saw blade 53 is used to make a first cut on a pipeline 28 at a first vertical height and a first horizontal location, and control panel 60 is used to move saw blade 53 to a second vertical height and a second horizontal location for a second cut on pipeline 28, the second vertical height being spaced apart from the first vertical height by at least 6 inches, 1, 2, 3, 4, 5, 6, 7, 8, 9, and/or 10 feet; and the second horizontal location being spaced apart from the first horizontal location by at least 6 inches, 1, 2, 3, 4, 5, 6, 7, 8, 9, and/or 10 feet. In various embodiments the vertical and horizontal spacings can be between about any two of the specified distances. In various embodiments the change in positions can be in the same X-Y vertical plane.

In one embodiment the saw blade 53 is used to make a first cut on a pipeline 28 at a first angle A from a horizontal line H, and control panel 60 is used to move saw blade 53 to a second angle A' from a horizontal line H for a second cut on pipeline 28, the second angle A' being shifted from the first angle A by at least 1, 2, 3, 4, 5, 6, 7, 8, 9, 10, 15, 20, 25, 30, 35, 40, and/or 45 degrees. In various embodiments the angular shifting can be between about any two of the specified angular shifts. In various embodiments the change in position can be in the same X-Y vertical plane.

In one embodiment is provided a method of salvaging a decommissioned marine pipeline 28 from a seabed 14, comprising the steps of:

a) providing a vessel 11 having a deck 12;

b) rigging a lift line 17 between the vessel 11 and the pipeline 28;

c) lifting the pipeline 28 to position an end portion of the pipeline on the vessel deck 12, and wherein the pipeline 28 extends between the vessel deck 12 and the seabed 14;

d) providing an articulating saw 20, the articulating saw having an articulating boom 150, the articulating boom 150 comprising a hydraulically powered elevator 47 along with at least two spaced apart rotating hydraulic actuators 48 and 49;

e) cutting the pipeline 28 on the vessel 11 with the band saw 20 that is hydraulically powered by a hydraulic motor 52 and hydraulically movable with the articulating boom 150; and f) wherein the saw 20 in steps "e" and "f" the band saw 20 can be selectively positioned in a generally vertical plane in multiple positions that are vertically spaced apart and that are horizontally spaced apart.

In one embodiment the boom 150 includes multiple hydraulic actuators 48 and 49 and further comprising independently controlling each actuator with hydraulics.

In one embodiment the elevator 47 and hydraulic actuators 48 and 49 are remotely controlled from a remotely located control panel 60.

In one embodiment the band saw 20 is movable horizontally and vertically by the hydraulic actuators 48 and 49.

In one embodiment the control panel 60 enables an operator 61 to control the band saw 20 from a position that is spaced away from the saw blade 54.

In one embodiment the saw blade 54 can be positioned with the hydraulic actuators 48 and 49 at an angle (angle "A") relative to a generally horizontal line "H".

In one embodiment the band saw 20 has a hydraulic motor torque that is maximized by applying up to about two thousand five hundred (2,500) pounds per square inch of hydraulic pressure that is determined by the cutting feed rate.

In one embodiment in steps "d" and "e" the actuators 48 and 49 are independently controllable with the control panel 60.

In one embodiment the elevator 47 travels between elevated and lowered positions upon a frame 40, and a hydraulic lift cylinder 100 connects between the frame 40 and the elevator 47.

In one embodiment the control panel 60 has a pressure gauge for monitoring hydraulic pressure of the lift cylinder 100, a lift cylinder control valve that enables control of elevator 47 position, and wherein a saw 20 cutting rate (e.g., movement in the direction of arrow 152) can be controlled by operator 61 monitoring of the pressure gauge and by operator control of the lift cylinder 100 control valve.

In one embodiment the movement of saw 20 in the direction of arrow 47 is controlled by control of the release rate of fluid from hydraulic cylinder 110. In this embodiment, in order for hydraulic rod 110 to move in the direction of arrow 150, hydraulic fluid can be pumped into cylinder 100 causing rod 110 to move in the direction of arrow 150 and causing elevator 47 (and saw body 51) to move in the direction of arrow 150. In order for saw body 51 to move in the direction of arrow 152, hydraulic fluid can be released from cylinder 100 causing rod 110 and elevator 47 to move in the direction of arrow 152. Now the speed of movement of rod 110 can be controlled by the amount of fluid released from cylinder 100 such as though use of a valve. The amount of fluid leaving cylinder 100 is dependent on the pressure inside cylinder 100, the pressure outside of cylinder 100, and the restriction by the valve. The pressure inside cylinder 100 is dependent on the weight of saw 20 along with the reaction force placed on saw blade 53 by pipeline 28 when being cut with saw blade 53. To slow down the feed rate of (and reduce the reaction force on) saw blade 53, the operator 61 can increasing partially close the valve allowing fluid to exit cylinder 100. To increase the feed rate the operator can increasingly partially open the valve until a desired feed rate pressure is obtained. The feed rate (movement of saw 20 in the direction of arrow 152) will be a function of the reaction force (in the direction of arrow 150) of pipeline 28 on saw blade 53.

In one embodiment the band saw 20 includes a cooling fluid delivery flow line 65 that enables transmission of cooling fluid to the saw blade 54.

In one embodiment the band saw 20 includes a camera 300 (not shown) that enables viewing of the cutting blade 54 and a monitor 210 (not shown) next to the control panel 60 that enables the operator 61 to view the cutting blade 54 during cutting.

In one embodiment in step "d" the saw is a diamond wire saw 72.

In one embodiment the speed of the cutting blade 54 can be monitored by operator 61 at control panel 60. In one embodiment monitoring of blade speed is performed by monitoring the amount of fluid flow through drive motor 52. In one embodiment a flow meter (not shown) is connected to drive motor 52 and included in control panel 60 which allows operator 61 to monitor the flow rate through drive motor 52.

In one embodiment this flow rate is cross referenced to linear speed rate of saw blade 54. In one embodiment this correlation is made with blade speed in feet per minute and/or centimeters per minute. This option will allow different blade 54 speeds to be selected for different blades used on the same cutting job. This option will also allow the operator to control the feed rate (i.e., the rate at which blade 54 feeds through the target material, e.g., movement of saw 50 generally in the directions of arrows 152 or 150) based on the speed of the blade 54. For example, where the speed of blade 54 drops, the operator 61 can reduce the feed rate of the saw 50 at least until a desired blade speed is obtained, where after the feed rate can be increased.

EXAMPLE CUTTING JOB

Below is provided various steps in an example cutting job.

1. Job to be performed is discussed at length with Customer and associated engineers. Details including, but not limited to, tooling placement on vessel 11, shipboard power requirements, water depth, pipe sizes to be cut, offshore location, departure dock and safety orientation.

2. Articulating Band Saw 20 and support equipment can be prepared and function tested prior to transport. All items can be dispatched through a predetermined shipment carrier to the departure dock.

3. Articulating Band Saw 20 and support equipment can be transported via customer's supply vessel to the work location that could be a platform, drilling rig, drill ship, work barge 11, dive boat, or lift boat.

4. Equipment is offloaded via work platform crane 15 and placed on deck 12 in accordance with the vessel Captain or tool pusher's instructions.

5. All equipment is inspected by operator 61 personnel for transport damage.

6. Once equipment is placed and secured to the deck 12 or pipe support frame 35 via welding or bolting, the hydraulic control panel 60 is connected to a hydraulic power unit via one inch hydraulic supply and return lines.

7. A bundle of seven (7) one-half (½) inch control hoses can be used to connect between saw control panel 60 and articulating band saw 20.

8. Control panel 60 may be located anywhere on vessel 11 within the length of the hoses contained in the connecting hose bundle, and be spaced apart from articulating band saw 20.

9. A continuous band saw blade 53 is installed in band saw 20.
  a. Blade 53 can be selected based upon the type (round, square, solid, pipe, etc.) and hardness (i.e. carbon content, such as 4140, Stainless, etc) of the target material 30 to be cut.
  b. The type of blade selected defines the required blade speed that may be between 110 and 300 feet per minute as specified by the blade manufacturer. Blade speeds can exceed 300 feet per minute with system pressures less than 2,000 psi.

10. Operator 61 starts the hydraulic power unit and adjusts the appropriate output system pressure between 2,000 and 2,500 pounds per square inch.
  a. The system pressure determines the amount of torque applied by motor drive 52 to blade 53 drive wheel. System pressure is defined by the operating limits of the hydraulic motor 52 and the pressure requirements of the actuator motors 48 and 49 to lift the weight of the attached load (saw 20). Minimum system pressure for band saw 20 can be 2,000 pounds per square inch. Below this level, actuators 48 and 49 may not lift the weight of saw 20. Operation pressure can be set on a hydraulic power unit and system pressure can be monitored on control panel 60.

b. Normal cutting operation is between 1,200 pounds per square inch and 1,600 pounds per square inch at the motor. Higher torque requirements will automatically increase motor pressure until the system pressure level is reached, at which point the hydraulic fluid by-passes internal to drive motor 525 causing it to cog or stall. The maximum continuous operating pressure for the hydraulic motor used in band saw 20 is 2,500 pounds per square inch.

11. Generally, the flow rate of the hydraulic system fluid measured in gallons per minute (gpm) can determine the speed of the band saw blade 53 in feet per minute (fpm). The higher the flow rate, the faster the blade speed.

a. Blade 53 speed can be controlled via an infinitely variable flow control valve on control panel 60.

b. Flow rate can be measured and monitored via a flow meter (in gpm) mounted on control panel 60.

c. In a preferred embodiment, the operating range for band saw 20 at maximum system pressure (2,500 psi) is 3 gpm to 7 gpm, yielding a blade speed of 100 fpm to 270 fpm. Higher continuous blade speeds can be obtained by lowering the system pressure.

12. Once band saw 20 articulation and blade 53 revolution is tested and deemed good, a blade observation camera 300 and light are attached and tested via the video monitor 310 and recording system.

13. Target material 28, can be a pipeline up to 13 inches in outside diameter, is drawn over the pipe support frame 35. Operator 61 manipulates band saw 20 into cutting position via the hydraulic elevator 47 contained in the saw column 40 and movement of two independent hydraulic actuators 48 and 49.

14. Once band saw blade 53 is in the desired cut position over the target material 28, blade 53 is started and brought to desired speed via monitoring of hydraulic fluid flow rate to the saw's drive motor.

15. Operator 61 can lower (in direction of arrow 152) saw 20 to begin the cut by relieving pressure on the lifting elevator 47 via a pressure control valve located on the control panel 60.

a. The rate of cut and blade 53 speed can be constantly monitored by operator 60. The initial cut rate (the speed at which blade 53 cuts through the target 28 material) is held slow until the full height of blade 53 (about 1 inch) penetrates the target 28. Placing the full thickness of blade 53 into target 28 before increasing the feed rate resists blade 53 bending and cutting off line at an angle or breaking Feed rate can be controlled by controlling bleed pressure from 210 pounds per square inch to 190 pounds per square inch on the feed pressure indicator gauge.

b. Blade 53 speed can be monitored during the initial cut period and increased as necessary to maintain the predetermined speed. (Blade 53 slows from its 'free spin' speed in air when it contacts target 28 due to friction and cutting action on target 28, requiring a slight increase in flow rate to maintain proper speed).

c. The cut rate can be visually monitored by operator 61 and continuously adjusted to maximize the rate of blade 53 penetration in and through the target during the secondary stage of cutting. The secondary stage falls within the region of the target that falls between the initial full penetration of blade 53 (about 1 inch) and one third of the way through target 28 material. Typical feed rate pressure is 170 psi to 190 psi on the feed rate pressure indicator gauge.

d. This feed or target penetration cut rate can be increased dramatically during the third stage of the target 28, which third stage falls within the region of blade 53 penetration between one third and three fourths of the way through the target 28 material. Increase in feed rate of blade 53 can be controlled by operator 61 visually monitoring the cut rate of blade 53 and maximizing the feed rate. Typical feed rate pressure ranges between 170 pounds per square inch to as low as 140 pounds per square inch.

e. The feed rate slows during the final one fourth of the target 28 cut region as more surface area of the target 28 material is encountered by blade 53 (assuming a cylindrically shaped target 28 with hollow core, such as a pipe). In the final stage, the feed rate can be slowed by operator 61 restricting the pressure bleed off for elevator 47, which increases the feed pressure to about 160 pounds per square inch to 180 pounds per square inch range.

f. When the cut is completed, blade 53 feed can be stopped via a stop valve on control panel 60. This stop valve can remove the feed control valve from the hydraulic circuit and allow saw 20 and blade 53 to be lifted from the cut zone and positioned for a new cut via an infinitely variable elevator control valve on control panel 60.

16. All hydraulic fluid flow can be disengaged via control panel 60 once cut is complete or in the event that there is a blade 53 breakage.

17. Once cut is complete, blade can be stopped and saw 20 can be moved out of the cut zone via articulating motors 48 and 49. Vessel crane 15 can move cut piece 57 from the work area into a nearby storage container for later transport to shore and disposal.

18. Saw 20 can be thoroughly rinsed with a freshwater solution and all moving components lubricated.

19. After all target 28 sections (57, 57', 57", etc.) are cut, band saw 20 can be articulated into its storage position and secured in place. All hydraulic hoses can be disconnected and stored for transport. Quick connect fittings can be used between saw 20, control panel 60, and the hoses. The saw base 41 and support arms are unbolted and the entire system is transported.

20. Saw 20 can be maintained on standby until further use is needed.

21. All video footage can be recorded is reviewed for analysis and improvement.

The following is a Table of Reference Numerals and their descriptions.

| TABLE OF REFERENCE NUMERALS | |
|---|---|
| Reference Numeral | Description |
| 10 | pipe cutting system |
| 11 | barge/vessel |
| 12 | deck |
| 13 | water surface |
| 14 | seabed |
| 15 | first lift apparatus/crane |
| 16 | second lift apparatus/crane |
| 17 | lift line |
| 18 | lift line |
| 19 | stinger |
| 20 | articulating band saw |
| 21 | pipe support/roller |

-continued

TABLE OF REFERENCE NUMERALS

| Reference Numeral | Description |
|---|---|
| 22 | pipe support/roller |
| 23 | pipe support/roller |
| 24 | pipe support/roller |
| 25 | pipe support/roller |
| 26 | winch |
| 27 | winch cable |
| 28 | pipeline |
| 29 | rigging |
| 30 | pipe end |
| 31 | arrow |
| 32 | arrow |
| 33 | connection |
| 34 | arrow |
| 35 | pipe support frame |
| 36 | pipe support roller |
| 38 | catch basin |
| 39 | insulation |
| 40 | saw support frame |
| 41 | foot |
| 42 | fastener |
| 43 | column |
| 44 | slot |
| 45 | upper end portion |
| 46 | lower end portion |
| 47 | elevator |
| 48 | hydraulic actuator |
| 49 | hydraulic actuator |
| 50 | band saw |
| 51 | band saw housing |
| 52 | motor drive |
| 53 | band |
| 54 | saw teeth |
| 55 | arm |
| 56 | arm |
| 57 | cut section |
| 58 | arrow |
| 59 | arrow |
| 60 | hydraulic control panel |
| 61 | operator |
| 62 | controls/levers |
| 63 | instruments |
| 64 | header |
| 65 | nozzle |
| 66 | fluid spray |
| 67 | arrow |
| 68 | elevated pipe position |
| 69 | elevated pipe position |
| 70 | rotational position |
| 71 | rotational position |
| 72 | articulating diamond wire saw |
| 73 | hydraulic actuator |
| 74 | hydraulic actuator |
| 75 | hydraulic actuator |
| 76 | frame/elevator |
| 77 | arm |
| 78 | arm |
| 79 | u-shaped frame |
| 80 | diamond wire |
| 81 | concavity |
| 82 | end |
| 83 | end |
| 84 | roller guide |
| 85 | roller guide |
| 86 | roller guide |
| 90 | arrow |
| 100 | cylinder |
| 110 | rod |
| 112 | arrow |
| 114 | arrow |
| 116 | arrow |
| 125 | shut off lever |
| 140 | articulating boom |
| 150 | arrow |
| 152 | arrow |
| 154 | arrows |

-continued

TABLE OF REFERENCE NUMERALS

| Reference Numeral | Description |
|---|---|
| 156 | arrows |
| 160 | arrow |
| 162 | arrow |
| 164 | arrows |
| 170 | sliding boom |
| 172 | track |
| 173 | first end |
| 174 | second end |
| 175 | slot |
| 176 | roller |
| 177 | roller |
| 180 | cylinder |
| 182 | rod |
| 190 | support arm |
| 192 | support arm |
| 200 | retainer |
| 210 | brace portion |
| 220 | bearing portion |
| 250 | target |
| 252 | upper section |
| 254 | lower section |
| 256 | second lower section |
| 260 | support rod |
| 262 | support rod |
| 270 | riser, casing, or well bore |
| 272 | top of remaining riser, casing, or wellbore |
| 280 | arrow |
| 282 | arrow |
| 230 | angle |
| 300 | camera |
| 310 | monitor |
| 400 | drain line and sump pump |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An articulating band saw apparatus, comprising:
 a) a frame that includes a vertically extending section having upper and lower end portions;
 b) an elevator that moves between the upper and lower end portions;
 c) a first powered actuator supported on the elevator for movement therewith;
 d) a first arm having arm end portions, the first arm supported by the first hydraulic actuator;
 e) a second powered actuator supported by the first arm at a position spaced away from the first powered actuator;
 f) a second arm supported by the second powered actuator;
 g) an endless band type saw mounted on the free end of the second arm spaced away from the second actuator, the band saw including a band saw frame and a cutting blade;
 h) wherein the band saw is movable by articulation of the first and second actuators and resulting movement of the first and second arms.

2. The band saw apparatus of claim 1, wherein the actuators are independently controllable with the control panel.

3. The band saw apparatus of claim 1, wherein the elevator and actuators are remotely controlled from a remotely located control panel spaced away from the saw blade.

4. The band saw apparatus of claim 1, wherein the band saw is movable horizontally and vertically by the actuators.

5. The band saw apparatus of claim 1, wherein the saw blade can be positioned with the actuators at an angle relative to horizontal.

6. The band saw apparatus of claim 1, wherein the saw blade is powered by a motor, and the band saw motor torque is maximized by applying up to two thousand five hundred (2,500) pounds per square inch of hydraulic pressure that is determined by the cutting feed rate.

7. The band saw apparatus of claim 1, wherein the elevator travels between elevated and lowered positions upon a frame, and a hydraulic lift cylinder connects between the frame and the elevator.

8. The band saw apparatus of claim 7, wherein the control panel has a pressure gauge for monitoring hydraulic pressure of the lift cylinder, a lift cylinder control valve that enables control of elevator position, and wherein a saw cutting rate can be controlled by operator monitoring of the pressure gauge and by operator control of the lift cylinder control valve.

9. The band saw apparatus of claim 1, further comprising a fluid delivery flow line that enables transmission of cooling or lubrication fluid to the saw blade and target for freezing at least a portion of the target during a cut.

10. The band saw apparatus of claim 3, further comprising a camera that enables viewing of the cutting blade and a monitor next to the control panel that enables the operator to view the cutting blade during cutting.

11. The band saw apparatus of claim 1, wherein the saw blade is diamond wire, and comprising multiple roller guides on the band saw frame that support the diamond wire.

12. An articulating band saw apparatus, comprising:
 a) a frame that includes a vertically extending section having upper and lower end portions;
 b) an elevator that moves between the upper and lower end portions;
 c) a powered articulating boom mounted on the elevator;
 d) an endless band type saw mounted on the free end of the boom, the band saw including a band saw frame and a cutting blade; and
 e) wherein the band saw is movable in a vertical plane, both vertically and horizontally by articulation of the boom.

13. The band saw apparatus of claim 12, wherein the elevator and boom are remotely controlled from a remotely located control panel spaced away from the saw blade.

14. The band saw apparatus of claim 12, wherein the band saw is movable horizontally and vertically by the boom.

15. The band saw apparatus of claim 1, wherein the saw blade can be positioned with the boom at an angle relative to horizontal.

16. The band saw apparatus of claim 12, wherein the elevator travels between elevated and lowered positions upon a frame, and a hydraulic lift cylinder connects between the frame and the elevator.

17. The band saw apparatus of claim 13, wherein the control panel has a pressure gauge for monitoring hydraulic pressure of the lift cylinder, a lift cylinder control valve that enables control of elevator position, and wherein a saw cutting rate can be controlled by operator monitoring of the pressure gauge and by operator control of the lift cylinder control valve.

18. The band saw apparatus of claim 12, further comprising a fluid delivery flow line that enables transmission of cooling or lubrication fluid to the saw blade and target for freezing at least a portion of the target during a cut.

19. The band saw apparatus of claim 18, further comprising a camera that enables viewing of the cutting blade and a monitor next to the control panel that enables the operator to view the cutting blade during cutting.

20. The band saw apparatus of claim 1, wherein the saw blade is diamond wire, and comprising multiple roller guides on the band saw frame that support the diamond wire.

* * * * *